(12) United States Patent
Zimroni et al.

(10) Patent No.: US 10,820,159 B1
(45) Date of Patent: Oct. 27, 2020

(54) SYSTEMS AND METHODS FOR LOCATION TRACKING RELATING TO DYNAMICALLY GENERATED GEO DATA

(71) Applicant: XAD INC., New York, NY (US)

(72) Inventors: Carmel Zimroni, Campbell, CA (US); Reza Paul Banikazemi, San Jose, CA (US); Ravi Shukla, Livingston, NJ (US)

(73) Assignee: xAd, Inc., New York, NY (US)

( * ) Notice: Subject to any disclaimer, the term of this patent is extended or adjusted under 35 U.S.C. 154(b) by 0 days.

(21) Appl. No.: 16/663,118

(22) Filed: Oct. 24, 2019

(51) Int. Cl.
*H04W 24/00* (2009.01)
*H04W 4/029* (2018.01)
*H04W 4/02* (2018.01)
*H04W 4/021* (2018.01)

(52) U.S. Cl.
CPC ........... *H04W 4/029* (2018.02); *H04W 4/021* (2013.01); *H04W 4/023* (2013.01)

(58) Field of Classification Search
CPC ...... H04W 4/029; H04W 4/021; H04W 4/023
See application file for complete search history.

(56) References Cited

U.S. PATENT DOCUMENTS

| | | | |
|---|---|---|---|
| 9,769,604 B2 | 9/2017 | Lyman et al. | |
| 9,860,699 B1 | 1/2018 | Vaynblat et al. | |
| 2013/0238700 A1* | 9/2013 | Papakipos | G01S 19/34 709/204 |
| 2014/0370909 A1 | 12/2014 | Natucci, Jr. et al. | |
| 2016/0286345 A1* | 9/2016 | MacDonald | H04W 52/0229 |
| 2016/0321702 A1 | 11/2016 | Lerman et al. | |
| 2017/0034660 A1* | 2/2017 | Roy | H04W 4/023 |
| 2018/0192237 A1 | 7/2018 | Privitera et al. | |
| 2019/0313209 A1* | 10/2019 | Edge | H04W 4/029 |

\* cited by examiner

*Primary Examiner* — Barry W Taylor
(74) *Attorney, Agent, or Firm* — Morgan, Lewis & Bockius LLP

(57) ABSTRACT

A mobile device running a software application is configured to provide initial location data to a server when it is first turned on, or achieves a predetermined movement status. The server determines, based on the initial location data, geo data including a set of areas of interest (AOIs) near the mobile device and a region including the set of AOIs, and provides the geo data to the mobile device. The mobile device is further configured to track its locations when the mobile device is within any of the set of AOIs and to provide the tracked locations to the server. The mobile device is further configured to track its movement status after it has been outside the region, and, in response to a predetermined movement status being detected for a predetermined amount of time, obtain updated geo data including a new region and a new set of AOIs from the server. The software application enables efficient tracking of mobile device locations and reduces power consumption.

20 Claims, 14 Drawing Sheets

700

702 — providing, to a server in the network, location data indicating a first location of the mobile device at a first time 704 — receiving first geo data from the server, the geo data including a first region around the first location and a first set of points of interest in the first region, each of the first set of points of interest having a respective geographical boundary 706 — The respective geographical boundary of each of the first set of points of interest is associated with a respective entity and is based on a location and a geographical size of the respective entity.

708 — The first region is centered at the first location and has a radius determined by a location of a point of interest among the first set of points of interest that is furthest from the first location.

710 — The first set of points of interest are associated, respectively, with a plurality of distinct entities.

711 — The first set of points of interest includes a predetermined number of points of interest.

712 — The first geo data further includes data defining proximities of at least some of the first set of points of interest.

714 — registering the first geo data with an operating system of the mobile device (A)

716 — in response to the mobile device being detected to be inside a respective point of interests of the first set of points of interest, collecting location data indicating locations of the mobile device while the mobile device remains inside the respective point of interest

718-a — the collected location data includes first location data indicating a first series of locations corresponding, respectively, to a first series of time intervals spanning across a first portion of a time period during which the mobile device remains within the respective point of interest;

718-b — the collected location data further includes second location data indicating a second series of locations corresponding, respectively, to a second series of time intervals spanning across a second portion of the time period subsequent to the first portion of the time period; and

718-c — each time interval in the second series of time intervals is greater in duration than any of the first series of time interval

720 — providing at least some of the collected location data to the server

722-a — the collected location data includes first portions of location data collected during respective time windows of a series of first time windows, and second portions of location data collected during respective time windows of a series of second time windows subsequent to the series of first time windows, each of the series of second time windows being wider than any of the series of first time windows; and

722-b — providing collected location data to the server includes

722-c — at an end of each first time window of the series of first time windows, transmitting at least some of the first portion of the location data collected in the each first time window to the server; and

722-d — at an end of each second time window of the series of second time windows, transmitting at least some of the second portion of the location data collected in the each second time window to the server.

724 — each of the series of first time windows is about 1-5 minutes, and each of the series of second time windows is about 2-10 minutes

| 726 — in response to the mobile device being detected to have entered or exited the proximity of one of the first set of POIs, collecting location data of the mobile device and optionally transmitting location data of the mobile device to the server |

| 728 — perform other functions while the mobile device is in the proximity of the POI |

| 736 — after the mobile device is detected to have exited the first region and in response to the mobile device being detected to be at a predetermined movement status for a predetermined amount of time, providing, to the server, location data indicating a second location of the mobile device at a second time |

| 738 — the predetermined movement status indicates that the mobile device is stationary or has a speed of movement less than 5 miles/hour |

| 740 — Receiving second geo data from the server, second geo-data including a second region around the second location and a second set of points of interest in the second region, each of the second set of points of interest having a respective geographical boundary; and |

| 741 — The second region is centered at the second location and has a radius determined by a location of a point of interest among the second set of points of interest that is furthest from the second location. |

| 742 — The second geo data further includes data defining proximities of at least some of the second set of points of interest. |

| 750 — registering the second geo data with the operating system of the mobile device, the second geo data replacing the first geo data at the operating system |

| | |
|---|---|
| receiving, from the mobile device, collected location data indicating locations of the mobile device while the mobile device remains inside the respective point of interest; | 912 |

| | |
|---|---|
| the collected location data includes first location data indicating a first series of locations corresponding, respectively, to a first series of time intervals spanning across a first portion of a time period during which the mobile device remains within the respective point of interest; | 914-a |
| the collected location data further includes second location data indicating a second series of locations corresponding, respectively, to a second series of time intervals spanning across a second portion of the time period subsequent to the first portion of the time period; and | 914-b |
| each time interval in the second series of time intervals is greater in duration than any of the first series of time interval | 914-c |

| | |
|---|---|
| the collected location data includes first portions of the location data collected during respective time windows of a series of first time windows, and second portions of the location data collected during respective time windows of a series of second time windows subsequent to the series of first time windows, each of the series of second time windows is larger than any of the series of first time windows; and | 916-a |
| receiving, from the mobile device, collected location data includes: | 916-b |
| at an end of each first time window of the series of first time windows, receiving at least some of the first portion of the location data collected in the each first time window; and | 916-c |
| at an end of each second time window of the series of second time windows, receiving at least some of the second portion of the location data collected in the each second time window. | 916-d |

| | |
|---|---|
| the collected location data includes a series of locations for a period of time; and | 918-a |
| after receiving, from the mobile device, the collected location data, verifying that the mobile device is at the respective point of interest based on the series of locations | 918-b |

SYSTEMS AND METHODS FOR LOCATION TRACKING RELATING TO DYNAMICALLY GENERATED GEO DATA

TECHNICAL FIELD

The present disclosure is related to location-based information services, and more particularly to systems and methods for tracking mobile device locations relating to dynamically generated geo data.

BACKGROUND

Mobile devices (e.g., smart phones) often include built-in hardware and software that generate information useful to other software applications (apps) on the mobile devices. For example, an operating system (OS) of a mobile device often provides Location Services that generate information about the mobile device's location using, for example, global positioning system (GPS), Wifi and BT networks, Cellular tower triangulation, etc. The apps on the mobile device can choose which services to use based on their specified accuracy levels, with GPS being the most accurate and consuming the most resources. The OS can then generate information about the location and movement status of the mobile device, which are used by various apps on the mobile device to perform particular functions. Frequent requests to access the generated information, however, can result in excessive power consumption and unwanted background activities, especially when the apps are not being used by mobile users.

SUMMARY

According to some embodiments, a mobile device running a software application is configured to provide location information to a computer system or server via one or more networks when it is first turned on, taken off stand-by mode, or achieves a predetermined movement status after exiting a predefined region. The computer system or server determines geo data based on the received location data, the geo data including a region around the mobile device and a set of areas of interest within the region, and provides the region and the set of areas of interest to the mobile device. The software application is configured to register the geo data with an operating system of the mobile device, to collect the locations of the mobile device in response to the mobile device being proximate to or within any of the set of areas of interest, and to transmit the collected location data to the computer system and/or server. The mobile device running the software application is further configured to track its movement upon determination by its operating system that the mobile device has exited the region, until the predetermined movement status is detected (e.g., the mobile device has stopped moving and/or its movement has slowed down to a walking pace for a predetermined amount of time), at which time the mobile device transmits new location information to the computer system and/or server, receives from the computer and/or server updated geo data including a new region and a new set of areas of interest, and is ready to repeat the above processes based on the updated geo data. Thus, by collecting location data when the mobile device is proximate to or within any of a set of areas of interest within a region, and by dynamically adjusting the region and the set of areas of interest when the mobile device has moved to a new location, the software application enables efficient collection of mobile device location data and reduces power consumption and unwanted background activities when the mobile device is not proximate to or within any area of interest.

In accordance with some embodiments, a method is performed at a mobile device having one or more processors and memory storing instructions for execution by the one or more processors. The method includes providing, to a server in a network, location data indicating a first location of the mobile device at a first time. The method further includes receiving first geo data from the server, the first geo data including a first region around the first location and a first set of areas of interest in the first region. Each of the first set of areas of interest is a geographical area having a respective geographical boundary and is associated with a respective point of interest (AOI) or a respective entity. The method includes registering the first geo data with an operating system of the mobile device. The method further includes collecting location data indicating locations of the mobile device in response to the mobile device being detected to be inside a respective area of interest of the first set of areas of interest or in predefined proximity to the respective area of interest. The method includes providing collected location data to the server. The method includes, in response to a predetermined movement status for the mobile device being detected after the mobile device has exited the first region, providing, to a server, location data indicating a second location of the mobile device at a second time. The method further includes receiving second geo data from the server, the second geo data including a second region around the second location and a second set of areas of interest in the second region. Each of the second set of areas of interest having a respective geographical boundary. The method includes registering the second geo data with the operating system of the mobile device, the second geo data replacing the first geo data at the operating system.

In accordance with some embodiments, a mobile device includes one or more processors and memory storing one or more programs configured to be executed by the one or more processors. The one or more programs include instructions for performing the operations of the method described above. In accordance with some embodiments, a computer-readable storage medium has stored therein instructions that, when executed by a mobile device, cause the mobile device to perform the operations of the method described above.

In accordance with some embodiments, a method is performed at a server having one or more processors and memory storing instructions for execution by the one or more processors. The method includes receiving, from a mobile device, location data indicating a first location of the mobile device at a first time. The method includes determining first geo data based on the first location of the mobile device at the first time, the first geo data including a first region around the first location and a first set of areas of interest in the first region. Each of the first set of areas of interest having a respective geographical boundary. The first geo data may further includes data defining proximities of at least some of the first set of points of interest. The method further includes providing the first geo data to the mobile device. The method includes receiving, from the mobile device, collected location data indicating locations of the mobile device while the mobile device remains inside the respective area of interest. The method includes receiving, from the mobile device, location data indicating a second location of the mobile device at a second time, the second location being outside of each of the first set of areas of interest and each of the proximities. The method includes determining second geo data based on the second location of the mobile device at the second time, the second geo data including a second region around the second location and a second set of areas of interest in the second region. Each of the second set of areas of interest is a geographical area having a respective geographical boundary. The method further includes providing the second geo data to the mobile device.

In accordance with some embodiments, a computer system/server include one or more processors and memory storing one or more programs configured to be executed by the one or more processors. The one or more programs include instructions for performing the operations of the method for a server, as described above. In accordance with some embodiments, a computer-readable storage medium has stored therein instructions that, when executed by a server system, cause the server system to perform the operations of the method for a server described above.

BRIEF DESCRIPTION OF THE DRAWINGS

FIGS. 7A-7C are flowcharts illustrating a method performed by a mobile device for dynamic location collection according to certain embodiments.

FIGS. 9A-9C are flowcharts illustrating a method performed by a server for dynamic location collection according to certain embodiments.

DESCRIPTION OF THE EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first location could be termed a second location, and, similarly, a second location could be termed a first location, without departing from the scope of the various described embodiments. The first location and the second location are both locations, but they may or may not be the same location.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
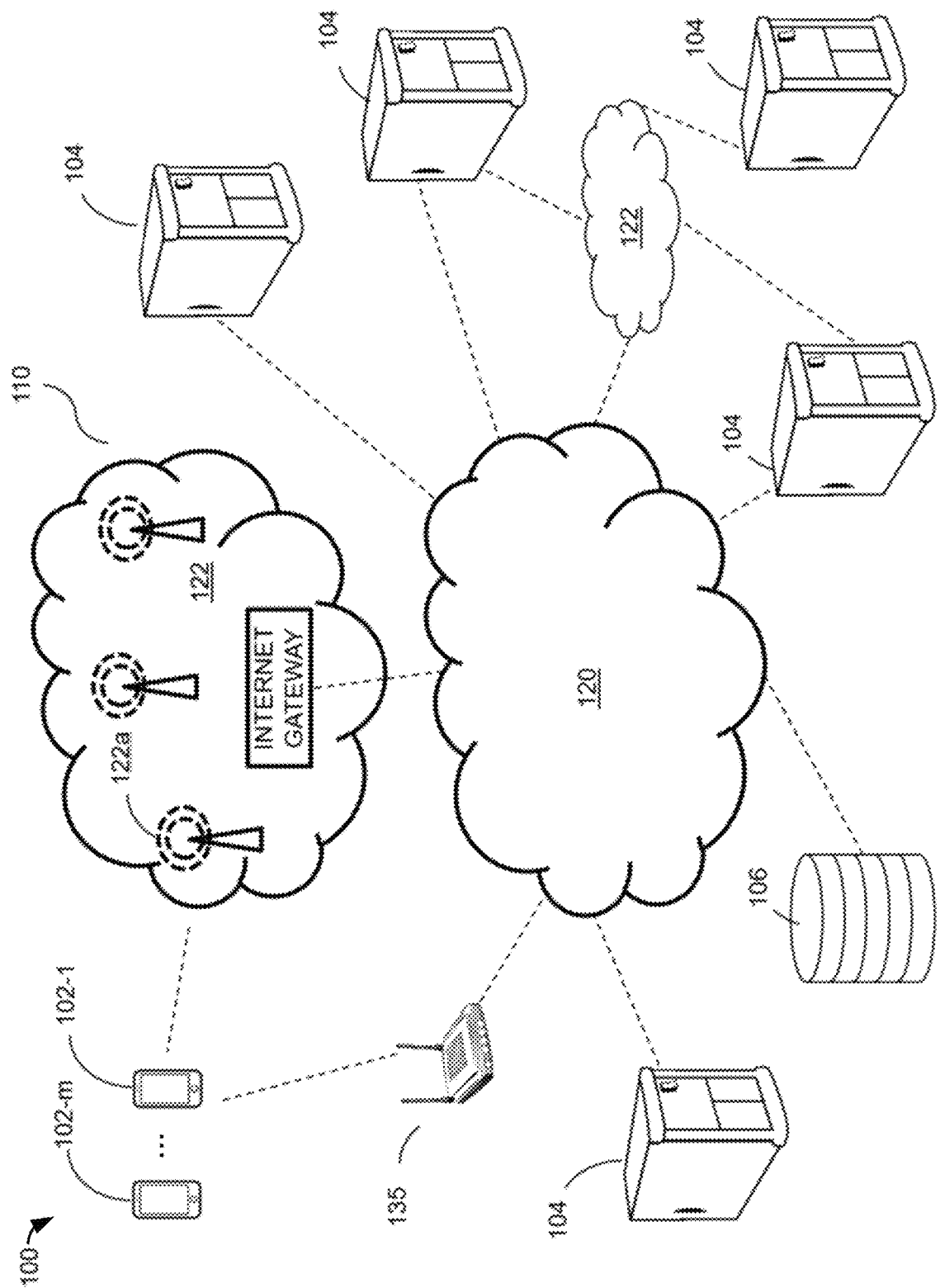
FIG. 1 is a diagrammatic representation of an environment for dynamic location collection of mobile device locations according to certain embodiments.

FIG. 1 is a schematic diagram illustrating an overview of an environment 100 in which some embodiments of the disclosed technology may operate. Environment 100 can include one or more computer systems 104 coupled to a packet-based network 110. The packet-based network 110 in certain embodiments includes the Internet 120 and part or all of a cellular network 122 coupled to the Internet 120 via an Internet Gateway. The computers/servers 104 can be coupled to the Internet 120 using wired Ethernet and optionally Power over Ethernet (PoE), WiFi, and/or cellular connections via the cellular network 122 including a plurality of cellular towers 122a. The network may also include one or more network attached storage (NAS) systems 106, which are computer data storage servers connected to a computer network to provide data access to a heterogeneous group of clients. As shown in FIG. 1, one or more mobile devices 102 (e.g., mobile devices 102-1 through 102-m, where m is an integer equal to or greater than 1) are also coupled to the packet-based network via cellular connections to the cellular network 122. When a WiFi hotspot (such as hotspot 135) is available, a mobile device 102 may connect to the Internet 120 via a WiFi hotspot 135 using its built-in WiFi connection. Thus, the mobile devices 102 may interact with computers/servers 104 coupled to the Internet 120. Examples of mobile devices 102 include smart phones and tablet computers.

Figure 2:
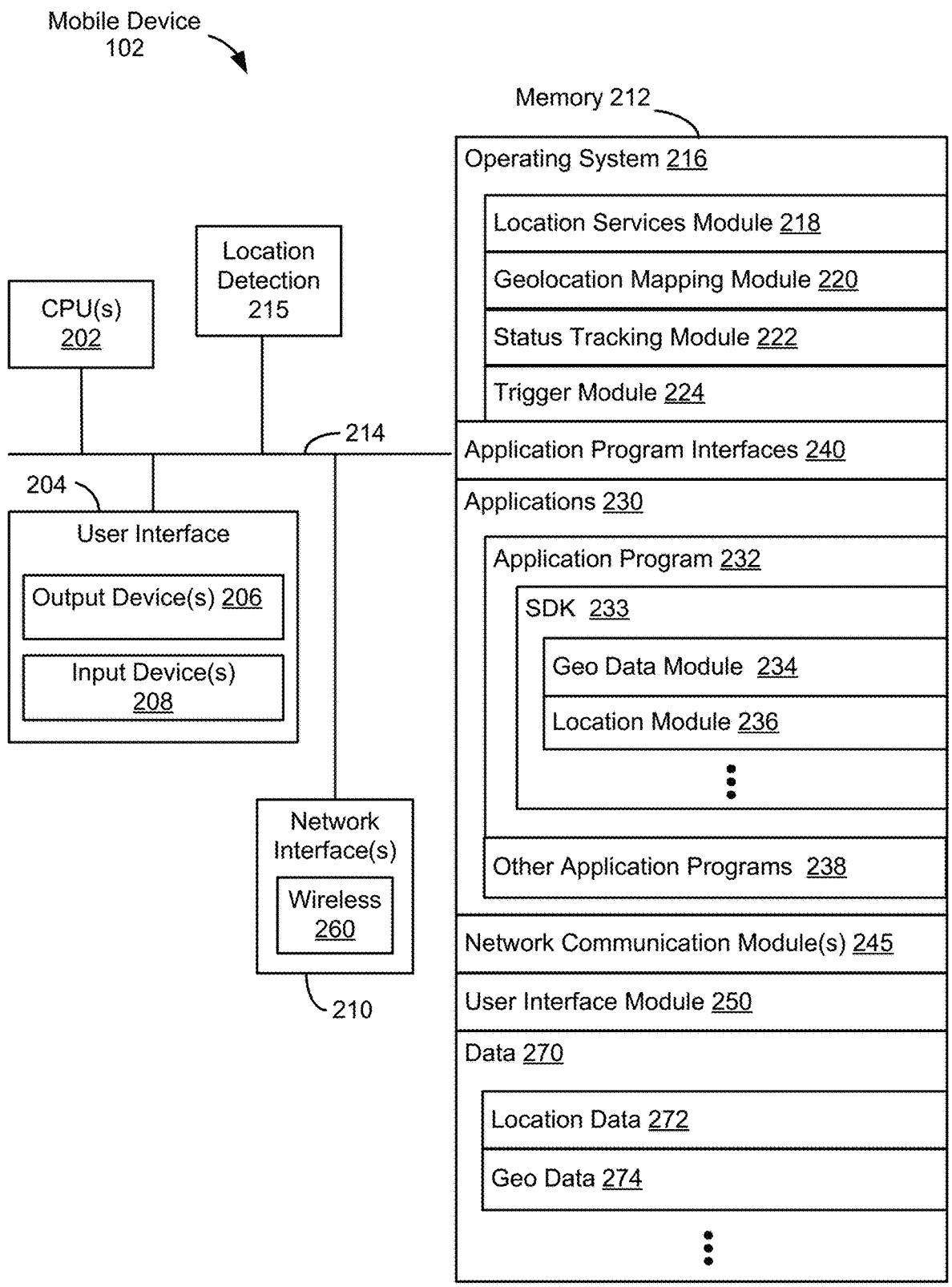
FIG. 2 is a diagrammatic representation of a mobile device according to embodiments.

FIG. 2 is a block diagram illustrating a mobile device 102 (e.g., any of mobile devices 102-1 through mobile device 102-m) in accordance with some embodiments. Mobile device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

Mobile device 102 further includes a user interface 204, including output device(s) 206 and input device(s) 208. In some embodiments, the input devices 208 include a keyboard, mouse, and/or track pad. Alternatively, or in addition, in some embodiments, the user interface 204 includes a display device that includes a touch-sensitive surface, in which case the display device is a touch-sensitive display. "User input," as described herein, may refer to a contact detected with a touch-sensitive display and/or an input by an input device 208. In some embodiments, the output devices (e.g., output device(s) 206) include a screen display and/or a speaker. Furthermore, some mobile devices 102 use a microphone and voice recognition device to supplement or replace the keyboard. Optionally, mobile device 102 includes an audio input device (e.g., a microphone) to capture audio (e.g., speech from a user).

In some embodiments, mobile device 102 includes one or more location detection mechanisms 215, which include hardware and/or software configured to determine the location of mobile device 102 and to provide location updates to an operating system of mobile device 102 and/or to software applications on mobile device 102 upon request. In some embodiments, location detection mechanisms 215 may include mechanism based on global navigation satellite system (GNSS) (e.g., global positioning system (GPS), GLONASS, Galileo, BeiDou or other geo-location signal receiver). Location detection mechanisms 215 may further include a network-based location machanism (e.g., location-detection software for determining the location of mobile device 102 using data collected from surrounding cell towers and WiFi access points).

In some embodiments, the one or more network interfaces 210 include wireless and/or wired interfaces for receiving data from and/or transmitting data to other mobile devices 102, a computer systems 104, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other mobile devices 102, computer systems 104, and/or or other wireless (e.g., Bluetooth-compatible) devices (e.g., for streaming audio data to an automobile, television, portable speakers, etc.). Furthermore, in some embodiments, the wireless interface 260 (or a different communications interface of the one or more network interfaces 210) enables data communications with other WLAN-compatible devices (e.g., portable speakers, television, etc.) and/or the computer systems 104 (via the one or more packet-based network(s) 110, FIG. 1).

In some embodiments, mobile device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices. Memory 212, or alternately, the non-volatile memory solid-state storage devices within memory 212, includes a non-transitory computer-readable storage medium. In some embodiments, memory 212 and/or the non-transitory computer-readable storage medium of memory 212 stores the following programs, modules, and data structures, or a subset or superset thereof, which, when executed by CPU(s) 202, causes CPU(s) 202 to perform or carry out various functions or procedures, including:

an operating system 216, including procedures for managing the mobile device hardware, memory, and software resources to make it possible for the mobile device to run apps, and for performing hardware-dependent tasks, such as obtaining location data from hardware (e.g., GPS) or software, tracking the location and movement status of the mobile device, detecting whether the mobile device is inside or outside of geo-fences, and providing the location data to applications on the mobile device requesting the information via, for example, an application program interface (API), operating system 216 including one or more modules (or APIs) such as the following according some embodiments:

location services module 218 for obtaining, processing, monitoring, and providing location data generated by hardware (e.g., GPS) or software of mobile device 102;

a geolocation mapping module 220 for storing and processing (e.g., registering) geolocation information (e.g., geo-fences, such as regions and areas of interests) received from applications;

a status tracking module 222 for tracking and/or providing the movement status of mobile device 102; and a trigger module 224 for triggering certain actions (e.g., starting or stopping providing location data to an application program or prompting the application program to start or stop collecting location data) when mobile device 102 is detected to be at certain locations or movement status, such as entering and/or exiting a geo-fence (e.g., a area of interest and/or a region) registered with the operating system, and being a predetermined movement status for a predetermined amount of time, etc.;

application programs (or applications, or apps) 230 providing targeted services or functions, including, for example:

an application program 232 having a software development kit (SDK), which may include, for example:

a geo data module 234 configured to request geolocation information (e.g., such as areas of interests, proximities, and regions) and to register or update the geo data at the operating system 216; and a location module 236 configured to obtain, collect, and/or communicate mobile device location data under certain predefined conditions, as discussed in further detail below;

other application programs 238, such as a web browser application (e.g., Internet Explorer or Edge by Microsoft, Firefox by Mozilla, Safari by Apple, or Chrome by Google) for accessing, viewing, and interacting with web sites, and applications for word processing, calendar, maps, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support, etc.; and application program interfaces (APIs) 240, which may be part of operating system 216, and which facilitate interactions between different application programs on mobile device 104 and/or between application programs (e.g., application program 232) and hardware (e.g., location detection 215) and/or between application programs (e.g., application program 232) and operating system 216;

network communication module(s) 245 for managing communication between mobile device 102 and other computing devices (e.g., computer system 104, and/or other mobile devices) via the one or more network interface(s) 210 (wired or wireless) connected to one or more packed-based network(s) 110; and a user interface module 250 that receives commands and/or inputs from a user via the user interface 204 (e.g., from the input devices 208) and provides outputs for display on the user interface 204 (e.g., the output devices 206).

In some embodiments, SDK 233 may be a standalone program independently programmed onto mobile device 102 and may operate independently from any of the other application programs 230. In some embodiments, SDK 233 is part of application program 232, which also serves other functions.

In some embodiments, memory 212 further includes memory spaces for storing data or data structures 270 generated or used by the above programs and modules, including, for example, location data 272 received and/or collected by application program 232 from location detection mechanisms 215 or operating system 216, and geo data 274 (e.g., boundaries of AOIs and geo-graphical regions) received from computer/server 104.

Figure 3:
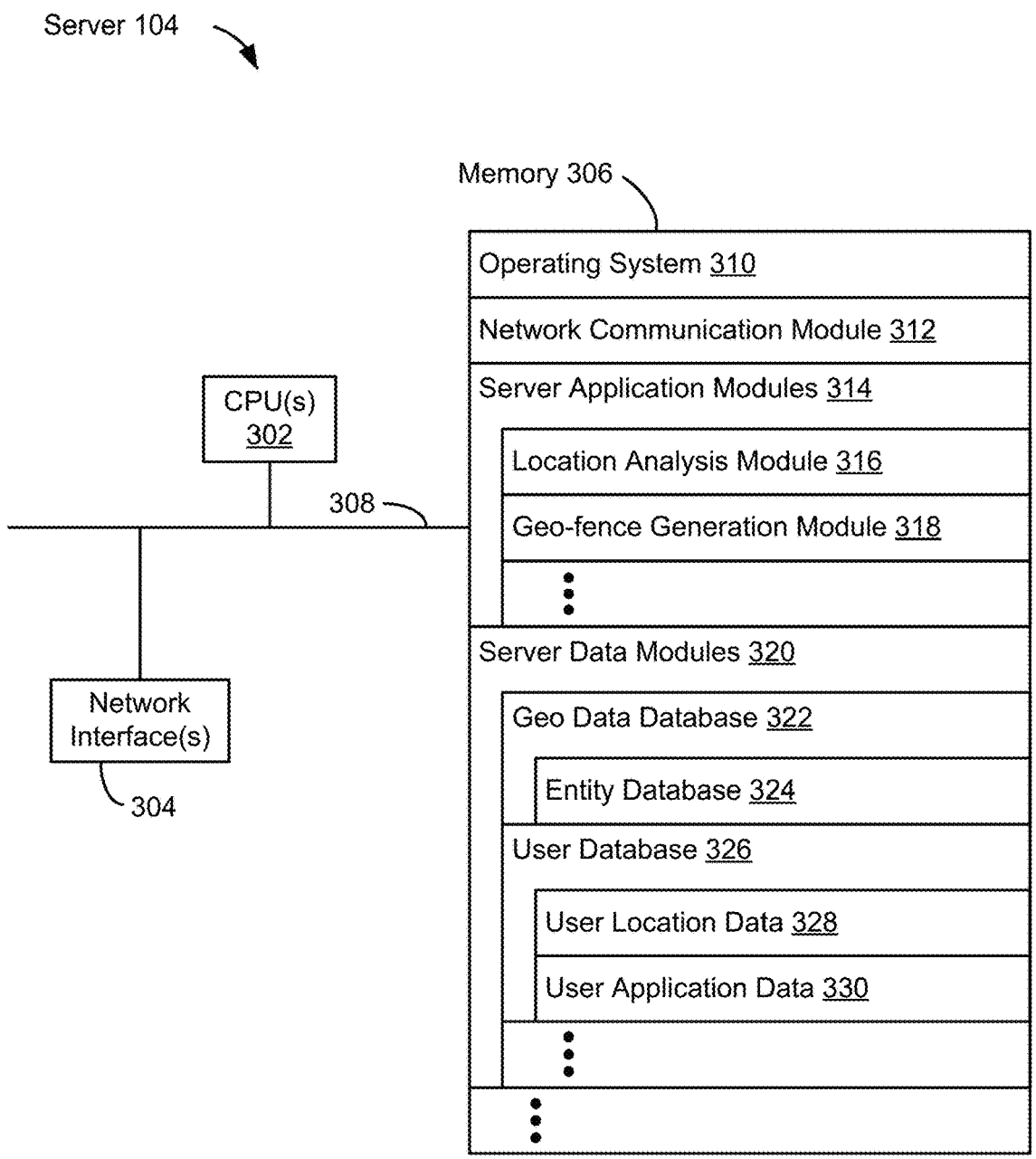
FIG. 3 is a diagrammatic representation of a computer/server that performs one or more of the methodologies and/or to provide part or all of a system for dynamic location collection according to embodiments.

FIG. 3 is a block diagram illustrating a computer/server system (referred to sometimes herein as "computer" or "server") 104 in accordance with some embodiments. The computer system 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for managing communication with other computing devices (e.g., mobile device 102) via one or more network interfaces 304 (wired or wireless) connected to one or more packet-based networks 110;

one or more server application modules 314 for performing various functions including, but not limited to, one or more of:

a location analysis module 316 configured to determine geolocation information (e.g., geo-fences, such as areas of interests and respective regions) based on received location data from mobile device 102, and further configured to verify the location of mobile device 102 based on the location data received by mobile device 102 via the one or more packed-based network 110;

a geo-fence generation module 318 configured to generate geolocation information or geo data (e.g., set of areas of interest in a region and the region) based on the location data received by mobile device 102 and/or analyzed by the location analysis module 316, and further configured to provide the set of areas of interest and the region to mobile device 102 via one or more packet-based networks 110; and one or more server data modules 320 for storing and accessing various information corresponding to areas of interest and/or one or more entities, the server data modules 320 including, but not limited to, one or more of:

Geo Data Database 322 configured to store and/or access geographic location information corresponding to respective areas of interest and/or proximities, including:

Entity Database 324 for storing and/or accessing entity information (e.g., type of entity, such as business, store, restaurant, service, etc.; geographical size of the entity; location of the entity; number of total entities; etc.), and one or more areas of interest associated with an entity; and User Database 326 for tracking and/or collecting user specific information, the user database 326 including, but not limited to, one or more of User Location Data 328 for storing and accessing location data received from mobile devices 102; and User Application Data 330 for storing and/or accessing specific application data, the user application data 330 being utilized by server 104 to provide mobile device 102 relative information about an application (e.g., associated entity information) and/or geographical information corresponding to the application (e.g., directions, advertisements, promotions, etc.).

In some embodiments, the computer system/server 104 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, modules stored in memory 212 may also be stored in memory 306 (and vice-versa). For example, the location analysis module 316 may be stored at the computer system/server 104 in memory 306 and/or stored in memory 212 at mobile device 102.

Although FIG. 3 illustrates the computer system/server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the computer system/server 104, and how features are allocated among them, will vary from one embodiment to another and, optionally, depends in part on the amount of data traffic that the server system handles during peak usage periods as well as during average usage periods.

Figure 4B:
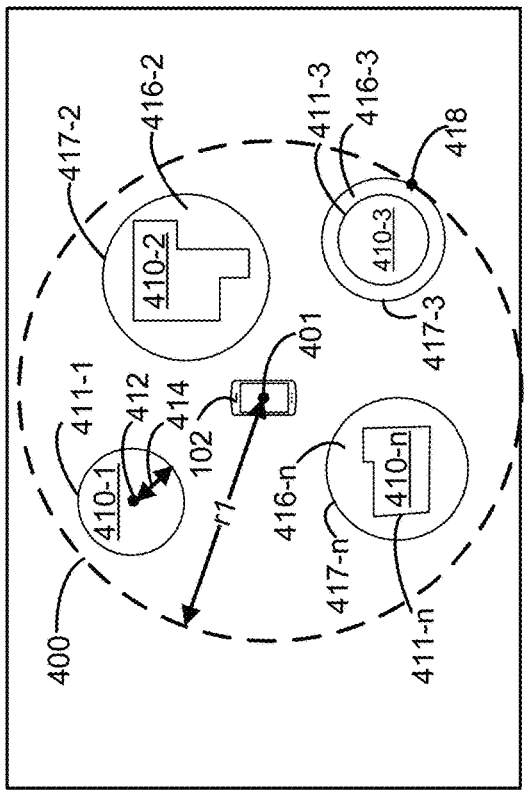
FIGS. 4A-4D are illustrative map showing locations and movements of a mobile device with respect to boundaries defined by first geo data according to certain embodiments.
Figure 4D:
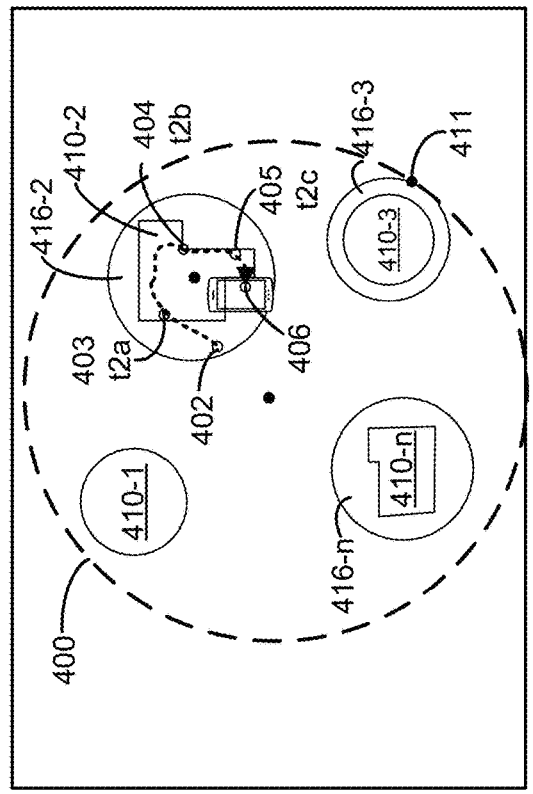
Figure 4A:
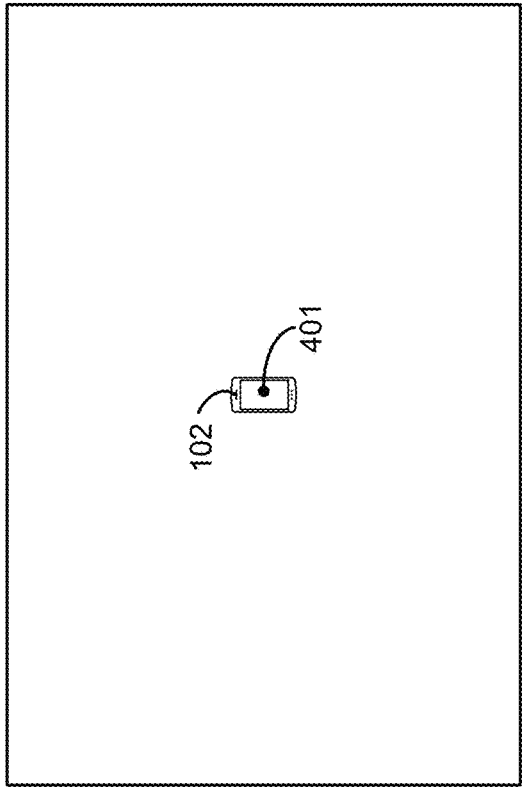

FIGS. 4A-4D illustrate an example of dynamic geo-fence based location data collection in accordance with some embodiments. In some embodiments, location detection mechanisms 215 of mobile device 102 is configurable to determine the location of mobile device 102 at a predetermined frequency. In some embodiments, location detection mechanisms 215 or operating system 216 of mobile device 102 is configurable to provide updates of the location of mobile device 102 (location updates) to location module 236 when certain prescribed conditions are met. The location updates can be provided at a specified frequency, or in response to changes in location by at least a preset minimum distance, or in response to requests from location module 236. In some embodiments, location module 236 is configured to collect at least some of the location updates (location data) provided by location detection mechanisms 215 or operating system 216. In some embodiments, as shown in FIG. 4A, operating system 216 is configured to provide location 401 at a first time t0 to application program 232 or prompt application program 232 to obtain the location, in response to mobile device 102 being turned on or taken off standby mode or having come to a stop or slowed down to an average walking speed (e.g., less than 5 miles per hour) for a predetermined amount of time after being moved around at speed higher than the average walking speed. In response, location module 236 in application program 232 provides, to a server 104, location data indicating location 401 of the mobile device at a first time (e.g., t=t0) via, for example, APIs 240 and network interface 210.

As shown in FIG. 4B, at time t1 soon after time t0, mobile device 102 receives first geo data defining a set of boundaries from the server 104. The first geo data include data defining a first region 400 around location 401 and a first set of areas or areas of interest (AOIs) 410 (e.g. AOIs 410-1 through 410-n, where n is an integer equal to or greater than 1) in the first region 400. In some embodiments, each of the AOIs 410 is a geographical area 410 inside a geographical boundary 411 associated with a respective POI or a respective entity. The geographical boundary 411 can be, for example, a perimeter of a physical structure (e.g., a building or premise) of the respective entity (e.g., perimeter 411-1 for AOI 410-1 and perimeter 411-n for AOI 410-n), or a geo-fence surrounding the physical structure of the respective entity (e.g., geo-fence 411-1 for AOI 410-1 and geo-fence 411-3 for AOI 410-3). In addition to the first set of AOIs 410 and the first region 400, the first geo data may include definitions of proximities 416 of some or all of the AOIs 410. Each proximity 416 corresponds to an area between a respective geographical boundary 417 surrounding the associated AOI and the geographical boundary 411 of the associated AOI 410 (e.g., proximity 416-2 corresponds to an area around AOI 410-2 that is between geographical boundary 417-2 and geographical boundary 411-2).

In some embodiments, the set of AOIs 410 includes a predetermined number of (e.g., 50) AOIs closest to the location 401, and the first region 400 can be a region (e.g., the smallest region) that includes the set of AOIs and first location 401. For example, as shown in FIG. 4B, the first region 400 is centered at location 401 and has a radius r1 equal to or greater than the distance between the first location 401 and a furthest point of the first set of AOIs 410 (e.g., point 418 of AOI 410-3) from location 401. In some embodiments, radius r1 is based on a furthest point of the proximities 416. In some embodiments, radius r1 is defined by server 104 based on what is in the vicinity of first location 401 (e.g., whether first location 401 is near downtown or commercial center or in a suburb, etc.), and the first set of AOIs are AOIs within the first region 400 and closest to first location 401, up to a predetermined maximum number (e.g., 50) of AOIs.

In some embodiments, when a geo-fence instead of a perimeter of actual physical structure is used to defined an AOI. The geo-fence can be set up based on a location and a geographical size of the respective entity. For example, AOIs 410-1 is centered at a respective location (e.g., 412) of the AOI and is defined by a respective radius (e.g., radius 414) from the respect center location (e.g., location 412), and the respective radius 414 is determined, at least in part, by the respective size of the entity. For instance, an entity with a larger physical footprint (e.g., shopping malls, retail store, grocery store, restaurants, stadiums, etc.) includes a larger respective radius than an entity with a smaller physical footprint (e.g., barbershops, nail salons, food trucks, etc.).

Figure 4C:
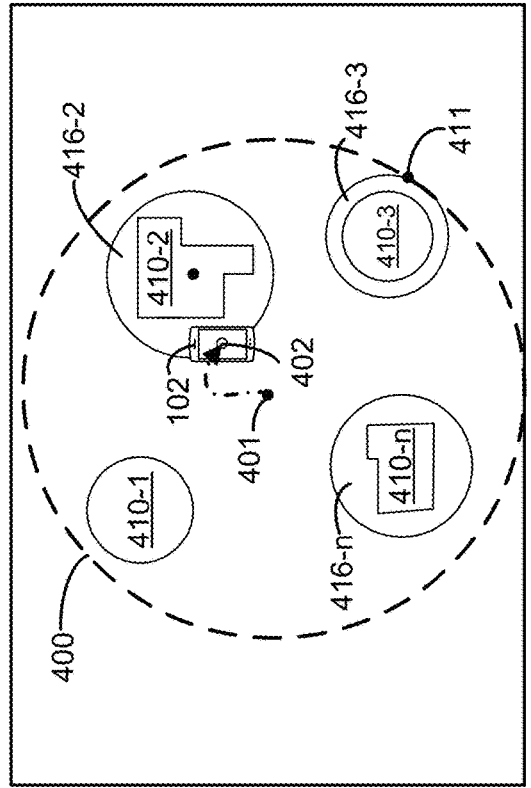

In response to receiving the first region 400 and the first set of AOIs, the geo data module 234 in application program 232 registers the first geo data with operating system 216 of the mobile device by providing region 400 and the first set of AOIs 410 to operating system 216. If any proximities 416 are also provided, geo data module 234 also provides the outer boundaries 417 of the proximities 416 to operating system 216. FIG. 4C illustrates mobile device 102 moving from location 401 at time t1 to another location 402 at time t2, and location 402 is within the proximity 416-2 of AOI 410-2. In some embodiments, because application program 232 has registered the proximity 416-2 with operating system 216, in response to detecting mobile device 102 being inside proximity definitions 416-2, operating system 216 provides location 402 to application program 232 or prompts application program 232 to obtain location 402 from location detection mechanisms 215. In response, location module 236 collect location 402 and may provide location 402 to application program 232 and/or server 104. Application program 232 may take other actions while mobile device 102 is inside proximity 416-2.

In some embodiments, operating system 216 is configured to provide location updates to application program 232 when certain prescribed conditions relating to the geo data are met. In some embodiments, location module 236 does not collect location data from location detection mechanisms 215 or operating system 216 until operating system prompts application program 232 to do so and stops collecting location data when operating system 216 instructs application program 232 to stop. FIG. 4D illustrates mobile device 102 as it is moved inside AOI 410-2 in accordance with some embodiments. Mobile device 102 is shown to move from location 402 in proximity 416-2 at time t2 to location 403 in AOI 410-2 at time t2a, location 404 in AOI 410-2 at time t2b, location 405 in AOI 410-2 at time t2c, and location 406 out of AOI 410-2 at time t3. In some embodiments, because geo data module 234 has registered the first region 400 and the first set of AOIs 410 with operating system 216, in response to detecting mobile device 102 being inside AOI 410-2 at time t2a, operating system 216 starts to provide location updates or prompts application program 232 to start collecting location updates from location detection mechanisms 215 or operating system 216. Thus, location module 236 starts at time t2a to receive or collect location data indicating locations corresponding to time intervals spanning across a time period during which mobile device 102 is detected to be within the AOI (e.g., AOI 410-2), and stops to receive or collecting location data at time t3 when operating system stops providing location updates to application program 232 or instructs application program 232 to stop collecting location updates from location detection mechanisms 215 in response to detecting the mobile device having exited the AOI (e.g., AOI 410-2). In some embodiments, location module 236 is configured to provide at least some of the locations corresponding to the time intervals to the server 104. In some embodiments, depending on the length of time mobile device 102 remain in AOI 410-2, location data may be collected by location module 236 at different frequencies during different portions of the time period when mobile device 102 remains in AOI 410-2. For example, location data may be collected by location module 236 and/or provided to the server 104 at a slower pace the longer mobile device 102 remains in the AOI, as discussed in further detail below with reference to FIGS. 6B-6C.

In some embodiments, location data is obtained and/or transmitted to server 104 at a lower frequency when mobile device 102 is in a proximity 416 of an AOI 410 than when mobile device 102 is within the AOI 410. For example, operating system 216 may be configured to provide just one or a few location updates in response to mobile device 102 having entered the proximity 416 of the AOI 410. On the other hand, location data is collected and transmitted to server 104 at regular time intervals when mobile device 102 is within the POI 410.

Figure 5A:
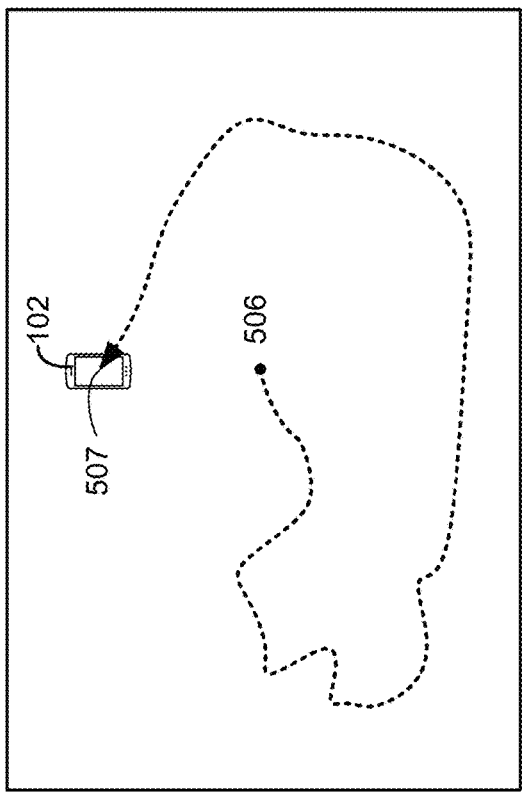
FIGS. 5A-5D are illustrative maps showing locations and movements of the mobile device with respect to boundaries defined by first geo data and later with respect to boundaries defined by second geo data according to certain embodiments.

FIGS. 5A-5D illustrate further examples of dynamic geo-fence based location data collection in accordance with some embodiments. FIG. 5A illustrates mobile device 102 moving from location 406 to another location 501 between time t3 and time t3a, and exiting proximity 416-2 at time t3a. Afterwards, mobile device 102 continues to move from location 501 to another location 502 between time t3a and time t3b, and enters proximity 416-3 at time t3b. In response, operating system 216 provides, or prompts application program 232 to obtain, location 502, and location module 236 collect location 502 and may provide location 502 to server 104 to inform the server 104 that mobile device 102 is in proximity 416-2. In some embodiments, location module 236 does not collect location data from location detection mechanisms 215 or operating system 216 during the period between time t3a and time t3b when mobile device 102 is not within any of the set of AOIs 410 or any of the proximities 416, and no location updates generated by location detection mechanisms 215 during this period is transmitted to the server 104.

At time t3c, mobile device 102 is detected to be at location 503 within AOI 410-3, and in response, operating system 116 provides location updates to application program 232 or prompts application program 232 or location module 236 to collect location data. In some embodiments, location module 236 receives or collects location data from operating system 216 or location detection mechanisms 215 for as long as mobile device 102 remains in AOI 410-2, and at least some of the location data received or collected by location module 236 is provided to server 104 while mobile device 102 remains and/or moves within the geographical boundary 416-3 of AOI 410-3 2. In some embodiments, to conserve power and to reduce unwanted background activities, operating system 216 is configured to stop providing or instruct application program 232 to stop collecting location data as soon as mobile device 102 is detected by operating system 216 to have exited AOI 410-3.

Figure 5B:
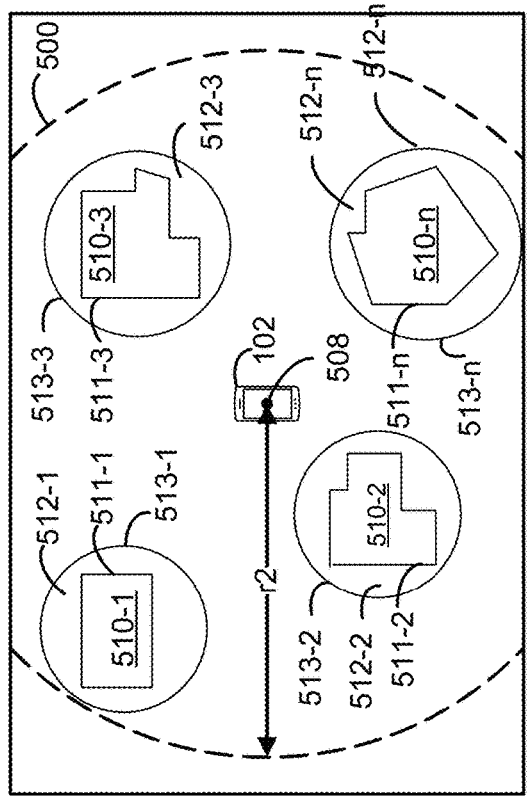

As shown in FIG. 5A, mobile device 102 moves from a location 503 at time t3c within AOI 410-3 to a location 504 at time t3d outside of AOI 410-3, from there to a location 505 outside of the first region 400 at time t3e, and from there to a location 506 outside of the first region 400 at time t4. In some embodiments, as the result of registering the first region 400 with operating system 216, operating system 216 is configured to start tracking movement status of mobile device 102, such as its speed of movement, when mobile device 102 is first detected to be outside of the first region 400 (e.g., at time t3e). FIG. 5B illustrates mobile device 102 moving from location 506 at time t4 to location 507 at time t5 at a speed higher than, for example, 5 miles per hour. In some embodiments, from time t4 to time t5, operating system 216 continues to monitor the movement status of mobile device 102, and location module 236 does not receive or collect location data from operating system 216 or location detection mechanisms 215, and, consequently, does not transmit any location data to the server 104.

Figure 5C:
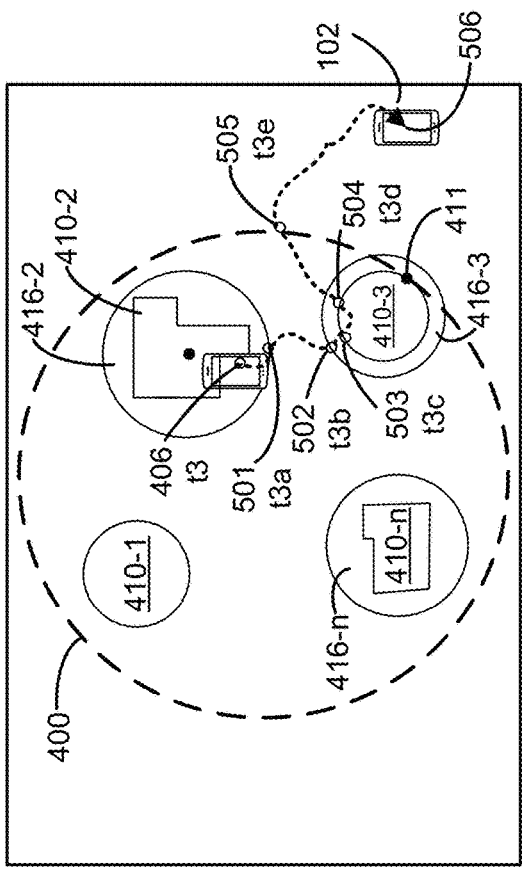
Figure 5D:
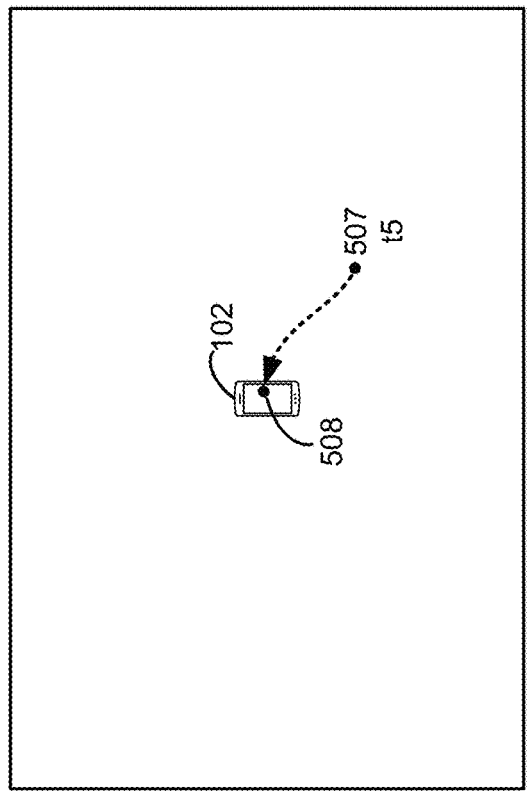

FIGS. 5C and 5D illustrate that mobile device 102 is detected to be at a second location 508 at time t6 and to have been in a predetermined movement status (e.g., stationary or moving at a speed of movement less than, for example, 5 miles/hour) for longer than a predetermined length of time (e.g., 5 minutes) in accordance with some embodiments. In response, operating system provides location 508 to application program 232 or prompts application program 232 to obtain location 508. In response receiving the location, location module 236 transmit, to the server 104, location data indicating the current location (e.g., location 508) of mobile device 102. In response, server 104 determines whether location 508 is inside any of the first set of AOIs 410 or proximities 416, and if not, server 104 would regard the location 508 as the new base for another set of geo data. Thus, as shown in FIG. 5D, after providing the location in response to detecting the predetermined movement status, mobile device 102 receives second geo data from the server 104. The second geo data include a second region 500 around the second location 508 and data defining a second set of areas of interest 510 in the second region 500. In some embodiments, the second geo data may further include definitions of proximities 512 for some or all of the AOIs 510. In response to receiving the second geo data, geo data module 234 registers the second geo data with operating system 216. Thus, the second geo data replaces the first geo data at operating system 216 (e.g., region 500, AOIs 510 and proximities 512 replace the previously registered region 400, AOIs 410, and proximities 416 at the operating system 216).

In some embodiments, the second location 508 can be inside or outside the first region. So, after mobile device 102 is detected to have exited the first region 400, it could re-enter the first region 400, but as long as the second location 508 is not within any of the first set of AOIs 410, it will be treated as a new location, based on which a new region 500 and new set of AOIs 510 are to be established.

FIG. 5D illustrates the second region 500 and the second set of areas of interest 510 in the second region 500 in accordance with some embodiments. In some embodiments, each of the AOIs 510 is a geographical area 510 inside a geographical boundary 511 associated with a respective entity. The geographical boundary 511 can be, for example, a perimeter of a physical structure (e.g., a building or premise) of the respective entity, or a geo-fence surrounding the physical structure of the respective entity. Each proximity 512 corresponds to an area between a respective geographical boundary 513 surrounding the associated AOI and the geographical boundary 511 of the associated AOI 510 (e.g., proximity 512-1 corresponds to an area around AOI 510-1 that is between geographical boundary 513-1 and geographical boundary 511-1).

In some embodiments, the set of AOIs 510 includes a predetermined number of (e.g., 50) AOIs closest to the location 501, and the first region 500 can be a region (e.g., the smallest region) that includes the set of AOIs and second location 508. For example, as shown in FIG. 5D, the second region 400 is centered at location 508 and has a radius r2 determined as the distance between the second location 508 and a furthest point of the second set of AOIs 510 from location 508. In some embodiments, radius r2 is defined by server 104 based on what is in the vicinity of second location 508 (e.g., whether second location 508 is near downtown or commercial center or in a suburb, etc.), and the second set of AOIs 510 are AOIs within the second region 500 and closest to second location 508, up to a predetermined maximum number (e.g., 50) of AOIs.

FIG. 6A-6D are timing diagrams illustrating timing of receiving, collecting and transmitting location data by location module 236 in accordance with some embodiments.

Figure 6A:
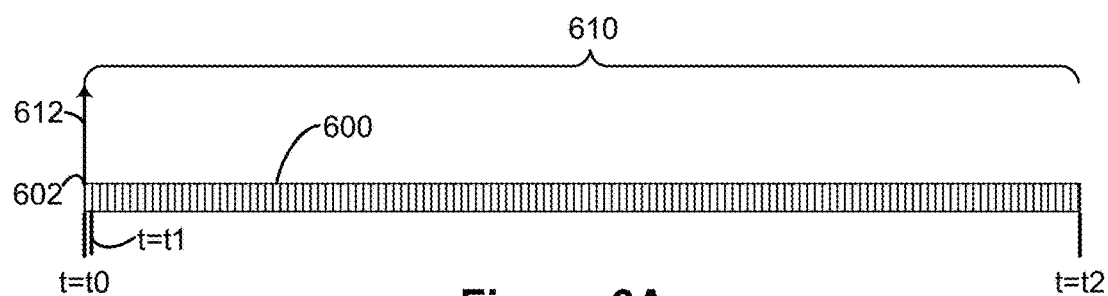
FIGS. 6A-6D are timing diagrams corresponding to FIGS. 4A-5D illustrating collection and transmission of location data according to certain embodiments.

FIG. 6A is a timing diagram corresponding to a time period 610 from time t0 to t2, as shown in FIGS. 4A-4B, in accordance with some embodiments. In some embodiments, location detection mechanisms 215 of mobile device 102 is configurable to provide location updates at the end of each of a series of time intervals 602, or in response to changes in location by at least a preset minimum distance, or in response to requests from operating system 216 and/or other software programs on mobile device 102. At time t0, mobile device 102 provides data 612 including location 401. Soon afterwards, at time t1, mobile device 102 receives, from the server 104, a first region 400 and a first set of areas of interest (AOIs) 410. In some embodiments, mobile device 102 further receives, from the server 104, proximities 416. In response, application program 232 registers the first region 400, the first set of areas of interest (AOIs) 410, and proximity 416 (if provided) with operating system 216. In some embodiments, as the result of the first region 400 and the first set of areas of interest (AOIs) 410 being registered with operating system 216, operating system 216 is configured to provide location updates or prompt application program 232 to collect location data from location detection mechanisms 215 or operating system 216 when mobile device 102 is detected to be inside any of the first set of AOIs 410. As discussed above, location module 236 is configured to request location update(s) from location detection mechanisms 215 or operating system 216 only under certain predefined conditions, such as, when the mobile device is turned on, or taken off from sleep or standby mode, or when application program 232 is prompted by operating system to do so. Thus, from time t1 to time t2, application program 232 does not receive or collect location data from operating system 216 or location detection mechanisms 215, because mobile device 102 is not inside any of the first set of AOIs 410 or any of the proximities 416 during this time period. As a result, no location data is collected by location module 236 and provided to the server 104 during time period 610.

Figure 6B:
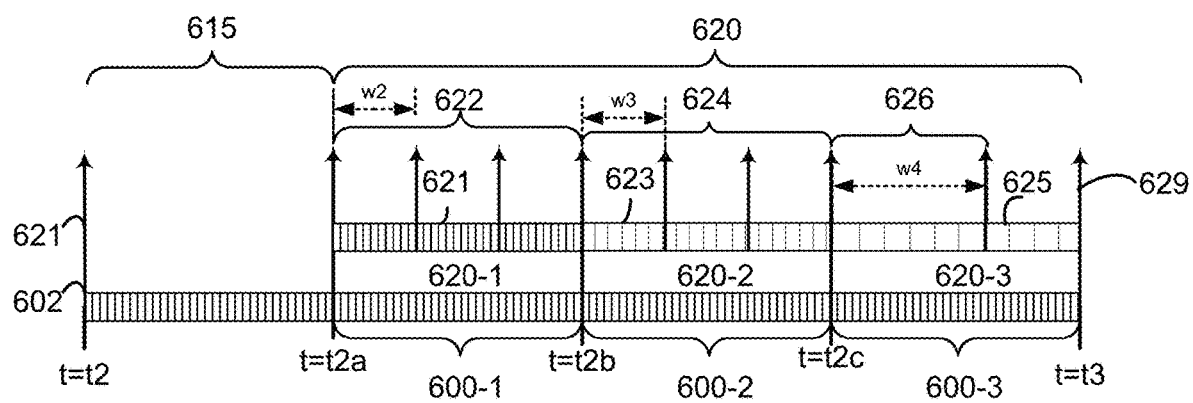
Figure 6C:
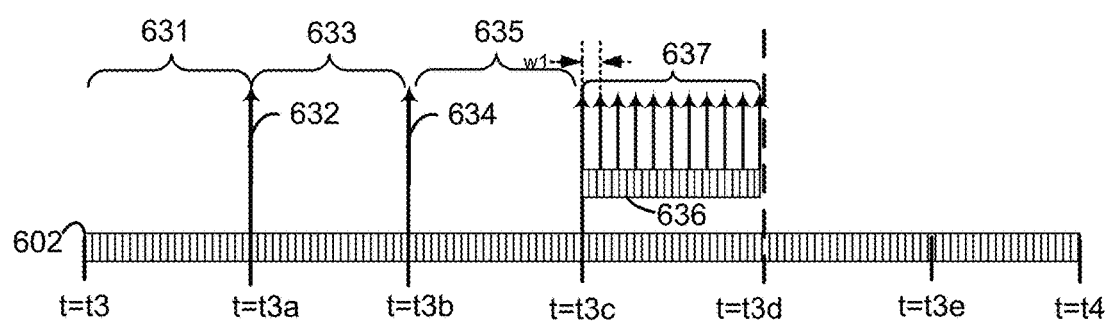

FIGS. 6B and 6C are timing diagrams showing various time periods between time t2 and time t4, in accordance with some embodiments. Time instants t2, t2a, t2b, t2c, t3, t3a, t3b, t3c, t3d, t3e, and t4 shown in FIGS. 6B and 6C corresponds, respectively, to time instants t2, t2a, t2b, t2c, t3, t3a, t3b, t3c, t3d, t3e, and t4 shown in FIGS. 4C, 4D and 5A. As shown in FIG. 6B, in response to detecting mobile device 102 to be inside a proximity (e.g., proximity 416-2 of AOI 410-2) at time t2, operating system 216 provides, or prompts application program 232 to obtain, location 402, and in response, location module 236 obtains location 402 and transmits data 621 including location 402 to server 104. Application program 232 may perform other functions during a time period 615 between time t2 and time t2a when mobile device 102 is in proximity 416 or goes back to dormant mode after transmitting data 621. At time t2a, mobile device 102 is detected to be inside AOI 410-2. In response, operating system 216 prompts application program 232 to start collecting location data until mobile device 102 is detected to be outside AOI 410-2. In some embodiments, operating system 216 is configured to alert application program 232 upon first detection of mobile device 102 inside AOI 410-2, and in response, location module 236 actively polls location detection mechanisms 215 or operating system 216 periodically or intermittently for updates on the location of mobile device 102 until operation system alerts application program 232 that mobile device 102 is no longer within the AOI. In some embodiments, location module 236 collects at least some of the location data received from location detection mechanisms 215 or operating system 216. In some embodiments, not all location data received from location detection mechanisms 215 or operating system 216 is collected by location module 236. For example, location detection mechanisms 215 may generate updates of the location of mobile device 102 in each of time intervals 602. Location module 236 may collect all of some of the updates of the location of mobile device 102 generated by location detection mechanisms 215 during a time period 620, when mobile device 102 remains in AOI 410-2. As mobile device 102 continues to remain in the AOI 410-2, location module 236 may progressively reduce the frequency at which location updates are collected. In some embodiments, location module 236 controls how often location detection mechanisms 215 or operating system 216 provides location updates to application program 232. For example, in some embodiments, operating system 216 is configured to alert application program 232 upon detection of mobile device 102 inside AOI 410-2, and in response, location module 236 collects location data by actively pinging location detection mechanisms 215 or operating system 216 periodically for updates on the location of mobile device 102 until operation system alerts application program 232 that mobile device 102 is no longer within the AOI.

For example, as shown in FIGS. 6B and 6C, the location data collected by location module 236 may include first location data indicating a first series of locations (e.g., from location 403 at time t2a to location 404 at time t2b, as shown in FIG. 4D) corresponding, respectively, to a first series of time intervals 621 spanning across a first portion 620-1 of time period 620. The location data further includes second location data indicating a second series of locations (e.g., from location 404 at time t2b to location 405 at time t2c, as shown in FIG. 4D) corresponding to a second series of time intervals 623 spanning across a second portion 620-2 of time period 620, third location data indicating a third series of locations (e.g., from location 405 at time t2c to location 406 at time t3, as shown in FIG. 4D) corresponding to a third series of time intervals 625 spanning across a third portion 620-3 of time period 620.

In some embodiments, the time intervals corresponding to which location data are collected get progressively bigger (or become more sparse) the longer mobile device 102 stays in AOI 410-2. For example, as shown in FIG. 6B, each of time intervals 623 is longer than any of time intervals 621, and each of time intervals 625 is longer than any of time intervals 623. Thus, in some embodiments, although location detection mechanisms 215 may continue to generate updates of the location of mobile device 102 for each time interval 602 in time period 620, the longer mobile device 102 remains in AOI 410-2, the less frequently location module 236 collects the location data from location detection mechanisms 215 or operating system 216.

In some embodiments, the collected location data is packaged and sent to the server 104 at the end of each of a series of time windows. In some embodiments, the sizes of the time widows are variable. For example, the sizes of the time windows can get wider the longer mobile device 102 remains in the AOI. For example, as shown in FIG. 6B, location module 236 can be configured to transmit to the server 104 location data collected in each of a first plurality of time windows 622 spanning across first portion 620-1 of time period 620 at the end of the each time window 622. Likewise, location module 236 is configured to transmit to the server 104 location data collected in each of a second plurality of time windows 624 spanning across second portion 620-2 of time period 620 at the end of the each time window 624, and to transmit to the server 104 location data collected in each of a third plurality of time windows 626 spanning across at least part of a third portion 620-3 of time period 620 at the end of the each time window 626. In some embodiments, as shown in FIG. 6B, each of time windows 622 during the first portion 620-1 of the time period 620 may have a width w1 that spans across a first number of time intervals 602, each of time windows 624 has a width w2 that spans across a second number of time intervals 602. The second number is greater than the first number, so the second width w2 is wider than width w1. Likewise, each of time windows 626 has a width w3 that is wider than w2. Thus, in some embodiments, although location detection mechanisms 215 may continue to generate an update of the location of mobile device 102 for each time interval 602 in time period 620, the longer mobile device 102 remains in AOI 410-2, the less frequently location module 236 transmit collected location data to server 104. In some embodiments, location data is collected by location module 236 at different frequencies during different portions of the time period 620. Further, location data may be provided to the server 104 at a slower pace the longer mobile device 102 remains in the AOI.

In some embodiments, portions 600-1 and 600-2 of time period 620 are equal in length in time (e.g., 5-60 minutes). In some embodiment, portions 600-1 and 600-2 are equal in length but portion 620-3 is ended and/or cut short as soon as mobile device 102 is not detected to be inside AOI 410-2 (as shown in FIG. 6B). In some embodiments, portions 600-1 and 600-2 of time period 620 are also not equal in length in time.

As shown in FIG. 6B, at time 3a, mobile device 102 is no longer detected to be within the respective geographical boundary 416-2 of AOI 410-2. In response, operating system 216 notifies application program 232, and location module 236 stops collecting location updates, and transmits data 629 including the location data collected since the end of time window 626 Operating system 216 of mobile device 102 continues to monitor and/or track location data received from location detection mechanisms 215 and use the location data to detect entry and/or exit of first region 400 and/or any of the first set of areas of interest 410 and/or any of the proximities 416.

As shown in FIG. 6C, at time t3a, mobile device 102 is detected to be existing proximity 416-2 at location 501. In response, operating system 216 provides, or prompts application program 232 to obtain, location 501, and location module 236 obtains and transmits data 632 including location 501 to server 104. At time t3b, mobile device 102 is detected to be entering proximity 416-3 at location 502. In response, operating system 216 provides, or prompts application program 232 to obtain, location 502, and location module 236 obtains and transmits data 634 including location 503 to server 104. At time t3b, mobile device 102 is detected to be within AOI 410-3. In response, under the direction from operating system 216, location module 236 is configured to collect location data indicating locations of mobile device 102 as long as mobile device 102 is detected to be inside AOI 410-3. In some embodiments, while mobile device 102 remains in the geographical boundary 416-3, location module 236 collects a series of locations corresponding to each of a series of time intervals 636 and provides at least some of the location data to the server 104. In some embodiments, location module 236 is configured to provide to server 104, at the end of each of a set of consecutive time windows 637, location data collected during the time window. As shown in FIG. 5A, at time t3d, mobile device 102 is detected to be outside AOI 410-3, at which time, location module 236 stops collecting location data, as shown in FIG. 6C. However, operating system 216 of mobile device 102 continues to monitor and/or track location data received from hardware such as a GPS and use the location data to detect entry and/or exit of region 400 and/or any of the set of areas of interest 410 and/or any of the proximities 416.

Figure 6D:
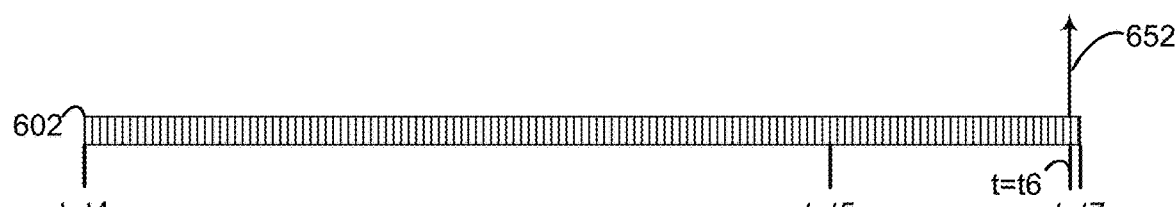

At time t3e and again at time t4, mobile device 102 is detected to be outside the first region 400, at locations 505 and 506, respectively. In some embodiments, when mobile device 102 is detected to be outside of the first region 400, operating system 216 is configured to track and/or monitor a movement status of mobile device 102 (e.g., speed of mobile device v>5 mph). In some embodiments, once mobile device 102 is detected to be outside of the first region 400, its movement status is tracked until a predetermined movement status (e.g., v<5 mph) is detected. In some embodiments, the predetermined movement status is a stationary status. In some embodiments, in response to the predetermined movement status being detected for a predetermined amount of time (e.g., time at predetermined movement status >5 min), application program 232 is alerted at time t6, and in response, it causes mobile device 102 to provide, to the server 104, location data 652 indicating the second location (e.g., 508) of mobile device 102, as shown in FIGS. 6D and 5D. Thus, as shown in FIGS. 6C and 6D, between time t3d and t6, location module 236 does not collect or transmit location data because mobile device 102 is not within any of the first set of AOIs 410, or having movement status other than the predetermined movement status while it is out of the first region 400.

FIGS. 7A-7C are flow diagrams illustrating a method 700 for location tracking based on dynamically generated geofences in accordance with some implementations. The method 700 is performed at a mobile device (e.g., mobile device 102 in FIGS. 1 and 2). Operations performed in FIGS. 7A-7C correspond to instructions stored in computer memory (e.g., memory 212 of mobile device 102, FIG. 2), according to some implementations.

As shown in FIG. 7A, method 700 includes providing (702) location data indicating a first location (e.g., 401 and 612, FIG. 4B and FIG. 6A, respectively) of mobile device 102 at a first time (e.g., time t0) to a server in the network (e.g., server 104). In some embodiments, an operating system at mobile device 102 (e.g., operating system 216), which regularly obtains updates on mobile device 102 locations may provide to application program 232 with location data indicating the first location 401 of mobile device 102, or instruct application program 232 to obtain the location data from location detection mechanisms 215, in response to mobile device 102 being turned on or taken off standby mode or having come to a stop or slowed down to an average walking speed (e.g., less than 5 miles per hour) after being moved around at speed higher than the average walking speed. In response, location module 236 causes mobile device 102 to provide the location data indicating the first location 401 of mobile device 102 to server 104, which determines first geo data including a first region 400 and a first set of areas of interest 410 in the first region 400 around the first location 401.

Method 700 further includes receiving (704) first geo data from the server 104. In some embodiments, the first geo data includes a first region (e.g., 400; FIG. 4) around the first location 401 and a first set of areas of interest (e.g., 410; FIG. 4) in the first region 400. In some embodiments, each of the first set of areas of interest 410 has a respective geographical boundary 411, and the respective geographical boundary 411 of each of the first set of areas of interest 410 is associated (706) with a respective entity and is based on a location and a physical structure or a geographical size of the respective entity. In some embodiments, the set of AOIs 410 includes a predetermined number of (e.g., 50) AOIs closest to the location 401, and the first region 400 can be a region (e.g., the smallest region) that includes all of the set of AOIs and first location 401. For example, the first region is centered (708) at the first location 401 and has a radius r1 determined by a location of a area of interest among the first set of areas of interest 410 that is furthest from the first location 401, or a location of proximities 416 that is furthest from the first location 401, as discussed above with reference to FIG. 4B. In some embodiments, the first set of areas of interest 510 are associated (710), respectively, with a plurality of distinct entities. In some embodiments, the first set of areas of interest 410 includes (711) at least 50 areas of interest. In some embodiments, the first geo data further includes (712) data defining proximities 416 of at least some of the first set of AOIs 410, such as data related to outer boundaries 417 of proximities 416.

Method 700 further includes, in response to receiving the first geo data at mobile device 102, registering (714) the first geo data with operating system 216 of mobile device 102. As a result, operating system 216 is set up to notify application program 232 in response to mobile device 102 entering exiting the first set of areas of interest 410 and/or the first region 400, and/or to take prescribed actions, as discussed above. In some implementations, operating system 216 is configured to alert application program 232 upon detecting mobile device 102 entering a area of interests (e.g., AOI 410-2) of the first set of areas of interest 410. In response, as shown in FIG. 7B, location module 236 collects (716) location data indicating locations of mobile device 102 while mobile device 102 remains inside the area of interest AOI 410-2, as discussed above with reference to FIGS. 4D to 6D.

In some embodiments, the collected location data includes (718-a) first location data indicating a first series of locations corresponding, respectively, to a first series of time intervals 621 spanning across a first portion 620-1 (e.g., from t2a to t2b) of a time period 620 during which mobile device 102 remains within AOI 410-2. The location data may further include (718-b) second location data indicating a second series of locations corresponding, respectively, to a second series of time intervals 623 spanning across a second portion 620-2 (e.g., from t2b to t2c) of the time period 620, which is subsequent to the first portion 620-1 of the time period 620. In some implementations, each time interval 623 in the second series of time intervals is greater in duration than any of the first series of time intervals 621 (718-c).

Method 700 further includes providing (720) at least some of the collected location data to the server 104. In some embodiments, the collected location data includes (722-a) first portions of location data collected during respective time windows of a series of first time windows, and second portions of location data collected during respective time windows of a series of second time windows subsequent to the series of first time windows, each of the series of second time windows being wider than any of the series of first time windows. In some embodiments, providing (722-b) collected location data to the server 104 includes: (722-c) at an end of each first time window of the series of first time windows, transmitting at least some of the first portion of the location data collected in the each first time window to the server 104; and (722-d) at an end of each second time window of the series of second time windows, transmitting at least some of the second portion of the location data collected in the each second time window to the server 104. In some embodiments, each of the series of first time windows is about 1-5 minutes, and each of the series of second time windows is about 2-10 minutes (724).

As shown in FIG. 7C, method 700 further includes in response to the mobile device being detected to have entered or exited the proximity 416 of one of the first set of AOIs 410, collecting (726) location data of the mobile device and optionally transmitting the collected location data of the mobile device to the server 104, and may further include performing (728) other functions while the mobile device is in the proximity 416. Method 700 further includes, after the mobile device is detected to have exited the first region 400 and in response to mobile device 102 being detected (736)

to be at a predetermined movement status for a predetermined amount of time, providing, to the server 104, location data indicating a second location (e.g., 507) of mobile device 102 at a second time (e.g., t6 and t7; FIGS. 5C and 5D, respectively). In some embodiments, the predetermined movement status indicates (738) that mobile device 102 is stationary (e.g., 0 miles/hour) or has a speed of movement less than 5 miles/hour (e.g., average walking pace such as 3 miles/hour). For example, as illustrated in FIGS. 5A through 5D, after mobile device 102 is detected to be outside of the first region 400 and having a speed of movement greater than 5 miles/hour, mobile device 102 is detected to have a stationary status (0 miles/hour) for more than, for example, 5 minutes, at time t6. In response, location data indicating a second location (e.g., 507 and 652, FIG. 5D and FIG. 6D, respectively) of mobile device 102 is provided to server 104 at a second time (e.g., t6).

After providing the location data indicating a second location (e.g., 507) of mobile device 102 at a second time (e.g., t6), method 700 further includes receiving (740), from the server 104, second geo data including a second region (e.g., region 500) around the second location (e.g., location 507) and a second set of areas of interest (e.g., AOIs 510) in the second region, each of the second set of areas of interest (e.g., 510) having a respective geographical boundary (e.g., 512). In some embodiments, the second region is (741) centered at the second location and has a radius determined by a location of a area of interest among the second set of areas of interest that is furthest from the second location. In some embodiments, the second geo data may further include (742) data defining proximities 512 of at least some of the second set of areas of interest 510. Method 700 further comprises registering (750) the second geo data with operating system 216 of mobile device 102, such that the second geo data replaces the first geo data at operating system 216. In this way, the operating system is updated to track and/or monitor the mobile device's 102 entry and/or exit of the second region 500, the second set of areas of interest 510, and optionally, proximities 512 of the second set of AOIs 510. Method 700 continues to perform steps 716, and 720 described above with respect to the second geo data, and so forth.

Figure 8:
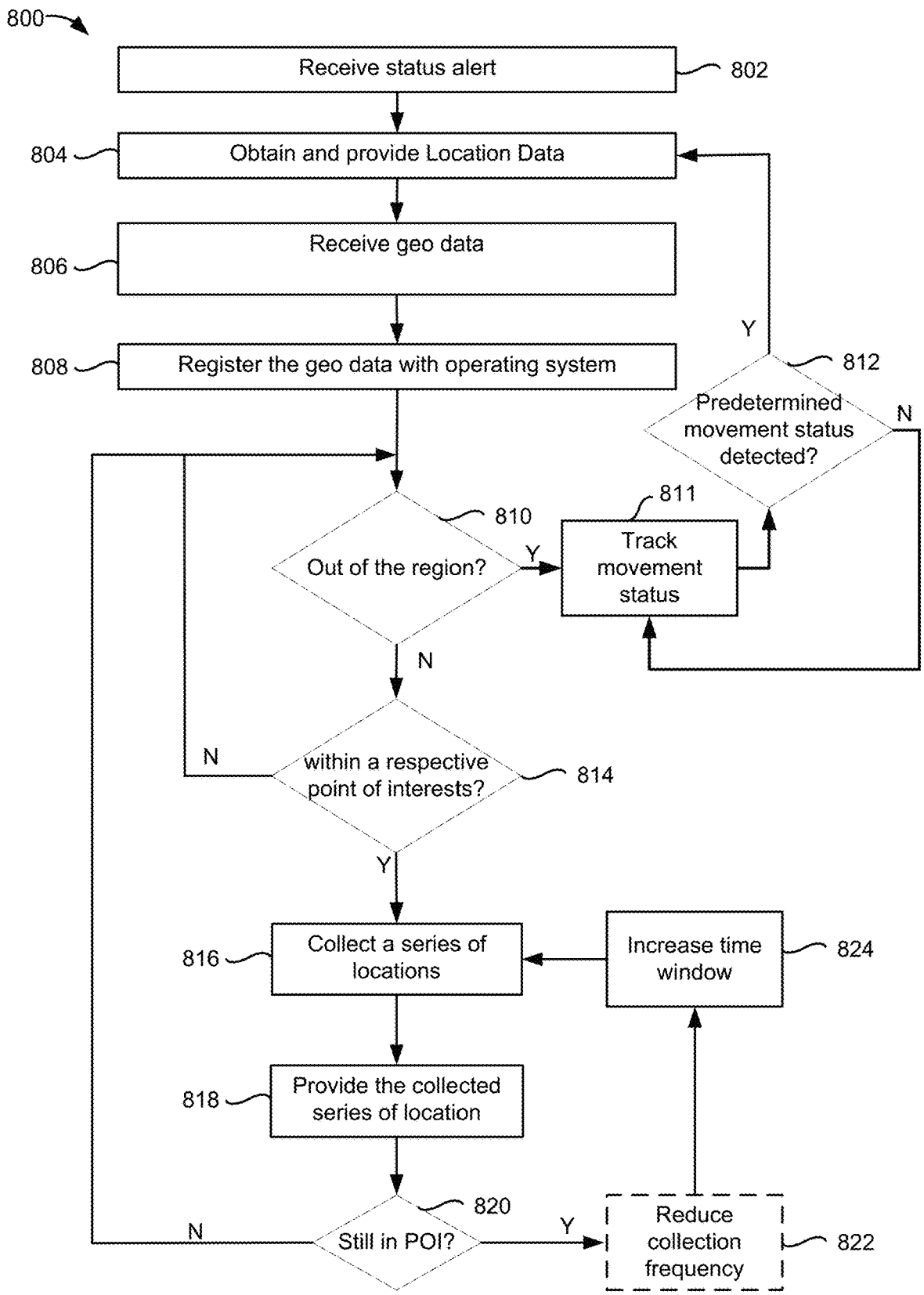
FIG. 8 is a diagram illustrating a method performed by a mobile device for dynamic location collection according to certain embodiments.

FIG. 8 is flow diagrams illustrating a method 800 performed at a mobile device (e.g., mobile device 102 in FIGS. 1 and 2) in accordance with some implementations. Operations performed in FIG. 8 correspond to the methods discussed above in FIGS. 4-7C.

In method 800, at step 802 a status alert is received indicating that mobile device 102 is initially start up or taken out of sleep mode or has been at a predetermined movement status (e.g., speed of movement less than 5 miles per hour) for a predetermined amount of time. At step 804, location data of a current location (e.g., location 401 or 508) is obtained and provided to a server 104. At step 806, geo data (e.g., first or second geo data) is received from the server 104, the geo data including a region around the location (e.g., first region 400 or second region 500) and a set of areas of interest in the region (e.g., first set of areas of interest 410 or second set of areas of interest 510). In some embodiments, the geo data further includes data defining proximities of at least some of the set of areas of interest. At step 808, the geo data is registered with an operating system (e.g., 216). Registering the geo data enables operating system 216 to monitor and/or track mobile device 102 with respect to the geo data and detect entry and/or exit of the region and the set of areas of interest. In this way, mobile device 102 is not continuously collecting and/or transmitting location data to the server 104 and only provides location data when one or more conditions are met (e.g., being inside a respective geographical boundary 416, having a predetermined movement status, etc.).

Method 800 further includes monitoring and/or tracking mobile device 102 to detect the location of mobile device 102 with respect to the geo data. At step 810, a determination is made on whether mobile device 102 is outside the region. If it is determined that mobile device 102 is outside the region, at step 811, movement status of mobile device 102 is monitored and/or tracked until mobile device 102 has reached a predetermined movement status. At step 812, if it is determined that the predetermined movement status has been detected, method 800 returns to step 804, in which location data indicating a current location of mobile device 102 is provided to a server 104.

If, at step 810, it is determined that mobile device 102 is still within the region, method 800 continues to determine, at step 814, whether mobile device 102 is within a respective area of interest. If, at step 814, it is detected, via operating system 216, that mobile device 102 is within a respective area of interest, method 800 proceeds to step 816 in which a series of location are collected at each of a series of time intervals, and to step 818, in which mobile device 102 provides the collected series of locations to the server 104.

At step 820, method 800 proceeds to determine if mobile 102 is still within the respective area of interest (e.g., 410-2) after a certain amount of time has passed since mobile device 102 is first detected to be inside the AOI. If it is determined at step 820 that mobile device 102 is no longer within the respective area of interest, method 800 returns to step 810. On the other hand, if at step 820, it is determined that mobile device 102 is still within the respective area of interest, method 800 optionally proceeds to step 822 in which a frequency at which location data of mobile device 102 is collected is reduced, as discussed above with reference to FIGS. 6B-6C. In some embodiments, method 800 further includes step 824, in which a frequency at which location data is provided to server 104 is reduced when mobile device 102 is detected to have a prolonged stay inside AOI 410-2.

Figure 9A:
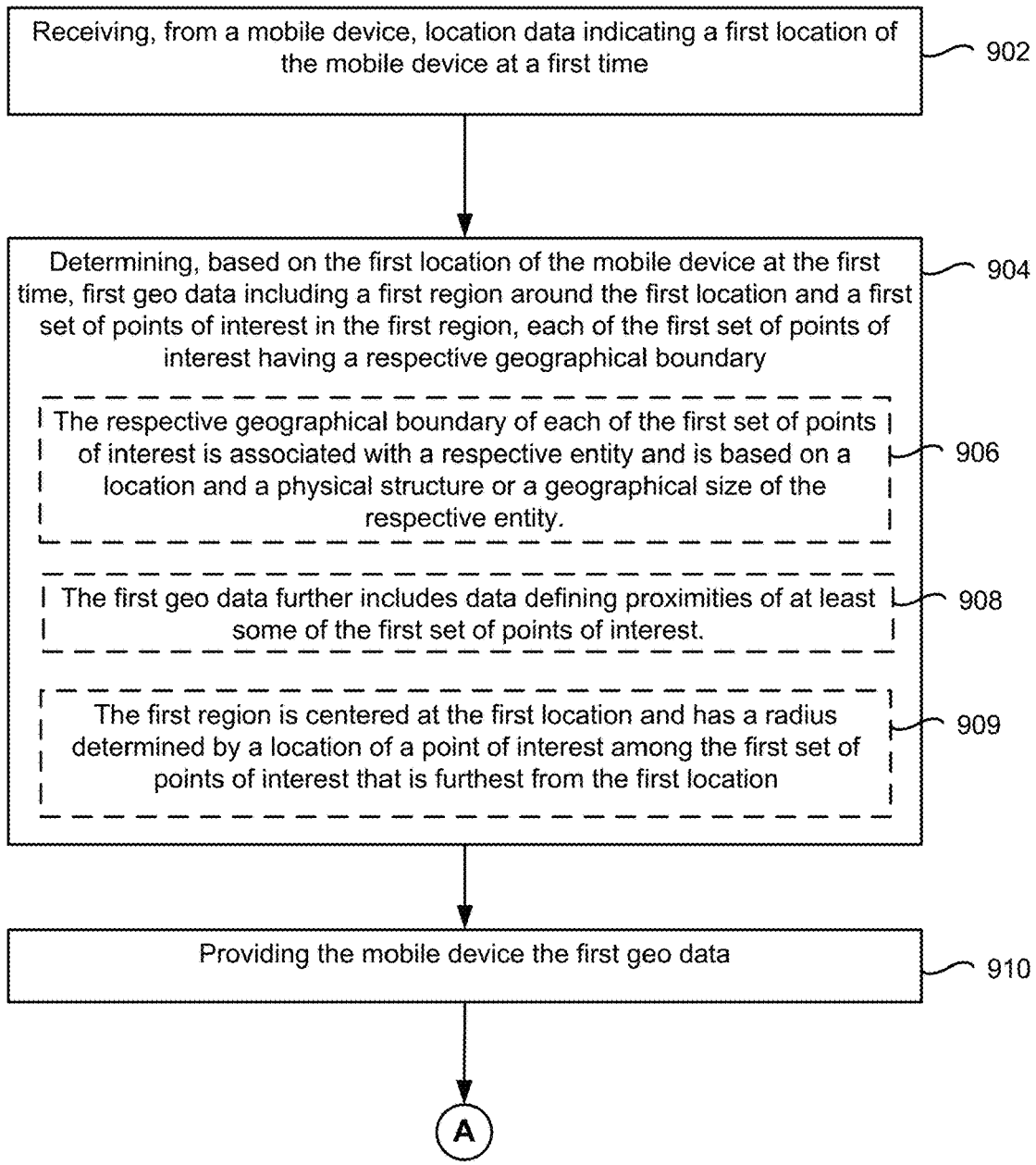
Figure 9C:
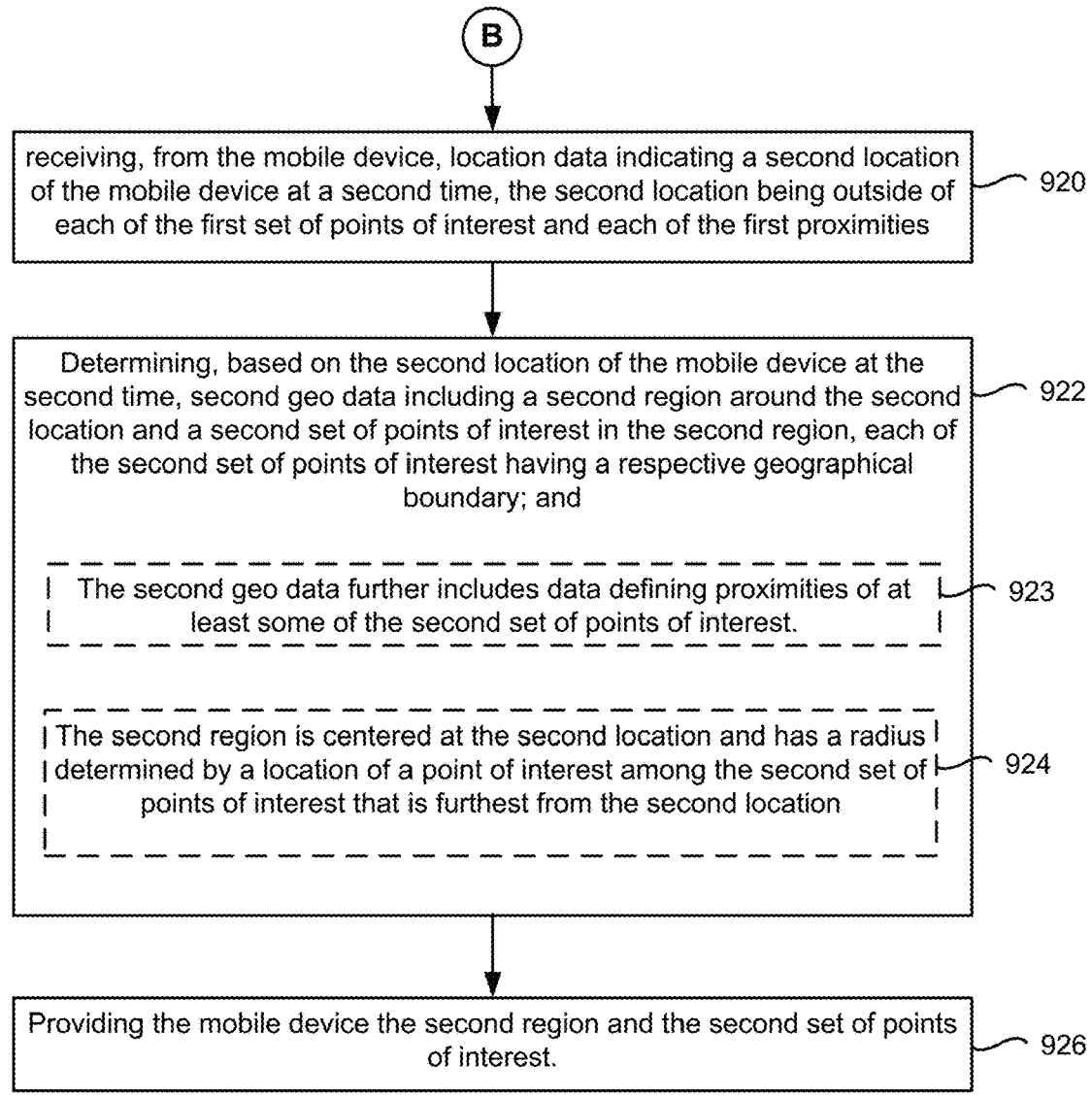

FIGS. 9A-9C are flow diagrams illustrating a method 900 for dynamically generation of geo-fences for location collection at a server (e.g., server 104 in FIGS. 1 and 3) in accordance with some implementations. Operations performed in FIGS. 9A-9C correspond to instructions stored in computer memory (e.g., memory 306 of server 105, FIG. 3). Method 900 performs similar features as those shown described above in FIG. 4A to FIG. 8.

As shown in FIG. 9A, method 900 includes receiving (902), from mobile device 102, location data indicating a first location (e.g., 401 and 612, FIG. 4B and FIG. 6A) of mobile device 102 at a first time (e.g., t0). For example, as illustrated in FIG. 4A and FIG. 6A, when mobile device 102 initially starts up or taken off sleep mode, location data is provide to the server 104.

Method 900 further includes determining (904), based on the first location 401 of mobile device 102 at the first time (e.g., t0), first geo data. In some embodiments, the first geo data includes a first region 400 around the first location 401 and a first set of areas of interest 410 in the first region 400, each of the first set of areas of interest 410 having a respective geographical boundary 411. In some embodiments, the respective geographical boundary 411 of each of the first set of areas of interest is associated (906) with a respective entity and is based on a location and a physical structure or a geographical size of the respective entity. In some embodiments, server 104 includes, or have access to, a geo data database 322 storing the geographical boundaries 411 of various areas of interests, and CPU(s) configured to retrieve the first set of areas of interest 410 from the geo data database 322 based on the first location 401 and/or the first region 400. In some embodiments, the first geo data further includes (908) data defining proximities 416 of at least some of the first set of areas of interest 410, as discussed above. In some embodiments, the set of AOIs 410 includes a predetermined number of (e.g., 50) AOIs closest to the location 401, and the first region 400 can be a region (e.g., the smallest region) that includes all of the set of AOIs and first location 401, as discussed above. For example, the first region 400 can be centered (909) at the first location 401 and has a radius r1 determined by a location of the first set of areas of interest 410 that is furthest from the first location 401, or a location of proximities 416 that is furthest from the first location 401, as discussed above. Method 900 further includes providing (910) the first geo data to mobile device 102.

As shown in FIG. 9B, method 900 further includes receiving (912), from mobile device 102, collected location data indicating locations of mobile device 102 while mobile device 102 is inside an area of interest (e.g., AOI 410-2). In some embodiments, the collected location data includes (914-a) first location data indicating a first series of locations corresponding, respectively, to a first series of time intervals 621 spanning across a first portion (e.g., from t2 to t2a) of a time period during which mobile device 102 remains within the respective area of interest. The location data may further include (914-b) second location data indicating a second series of locations corresponding, respectively, to a second series of time intervals 625 spanning across a second portion (e.g., from t2b to t2c) of the time period subsequent to the first portion of the time period. In some implementations, each time interval 625 in the second series of time intervals is (914-c) greater in duration than any of the first series of time intervals 621.

In some embodiments, the collected location data includes (916-a) first portions of location data collected during respective time windows of a series of first time windows, and second portions of location data collected during respective time windows of a series of second time windows subsequent to the series of first time windows, each of the series of second time windows being larger than any of the series of first time windows. In some embodiments, receiving (916-b) collected location data at the server 104 includes: (916-c) at an end of each first time window of the series of first time windows, receiving at least some of the first portion of the location data collected in the each first time window to the server 104; and (916-d) at an end of each second time window of the series of second time windows, receiving at least some of the second portion of the location data collected in the each second time window to the server 104.

In some embodiments, the collected location data includes (918-a) a series of locations for a period of time; and after receiving, from mobile device 102, the collected location data, the server 104 verifies (918-b) that mobile device 102 is at the respective area of interest based on the series of locations. For example, server 104 determines whether mobile device 102 is passing through a respective area of interest 410 and/or if mobile device 102 is within the respective point for interest 410. In some embodiments, server 104 utilizes the series of locations for the series of time intervals to verify that mobile device 102 has remained within the respective area of interest a predetermined amount of time. In some embodiments, the predetermined amount of time includes at least a first portion (e.g., t2 to t2a) of a time period (e.g., t2 to t3). Optionally, in some embodiments, in accordance with verification that mobile device 102 is at the respective area of interest 410, server 104 transmits verified location data to a third party, where the verified location data indicates that mobile device 102 is at the respective area of interest 410. In some embodiments, the third party is associated with a respective entity corresponding to the area of interest.

Method 900 further includes receiving (920), from mobile device 102, location data indicating a second location 507 of mobile device 102 at a second time, the second location being outside of each of the first set of AOIs 410. In response, method 900 further includes determining (922) second geo data based on the second location 507 of mobile device 102 at the second time, the second geo data including a second region 500 around the second location 507 and a second set of areas of interest 510 in the second region 500, each of the second set of areas of interest 510 having a respective geographical boundary 512. In some embodiments, the second geo data further includes (923) data defining proximities of at least some of the second set of areas of interest. In some embodiments, the second region 502 is centered (924) at the second location 507 and has a radius r2 determined by a location of the second set of areas of interest 510 that is furthest from the second location 507, of by a location of the proximities 512 that is furthest from the second location 507. Method 900 further includes providing (926) mobile device 102 the second region 500 and the second set of areas of interest 510. Method 900 continues to perform step 914 with respect to the second region 500 and the second set of areas of interest 510.

Figure 10:
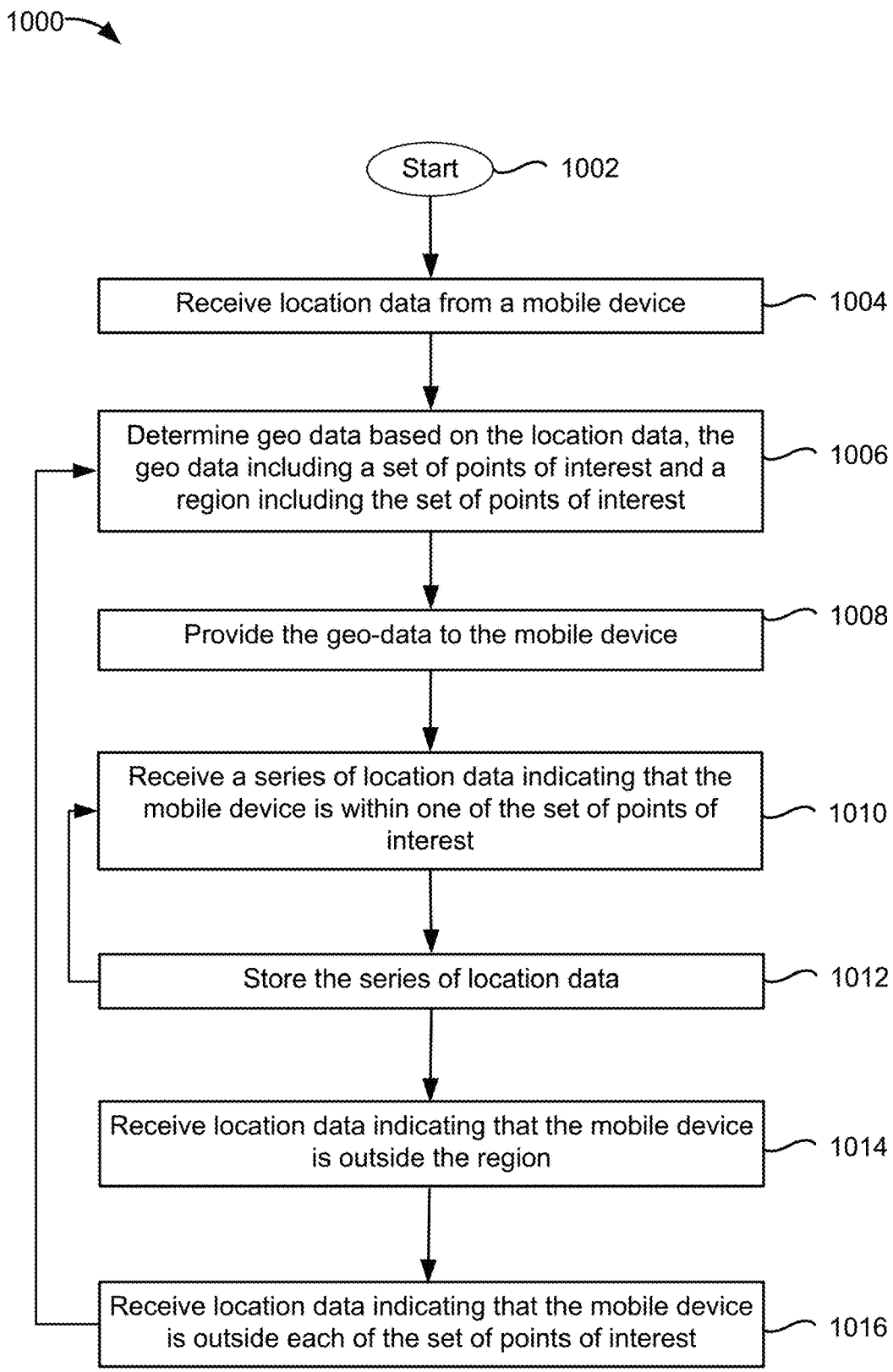
FIG. 10 is a diagram illustrating a method performed by a server for dynamic location collection according to certain embodiments.

FIG. 10 is a flow diagram illustrating a method 1000 performed at a server (e.g., server 104 in FIGS. 1 and 3) in accordance with some implementations.

At step 1002, method 1000 is started, and proceeds thereafter to step 1004, at which server 104 receives from mobile device 102 location data indicating a first location (e.g., location 401) of mobile device 102 at a first time.

At step 1006, server 104 determines geo data based on the first location of mobile device 102 at the first time, the geo data including a region around a location (e.g., region 400 or 500) and a set of areas of interest in the region (e.g., areas of interest 410 or 510). Each of the set of areas of interest has a respective geographical boundary. In some embodiments, the geo data further includes data defining proximities of at least some of the set of areas of interest (e.g., proximities 416 or 512). At step 1008, server 104 provides the geo data to mobile device 102.

Method 1000 proceeds to step 1010 in which server 104 receives location data indicating that mobile device 102 is inside a area of interest (e.g., AOI 410-2). For example, as described above in FIGS. 4A-6D, mobile device 102 provides to the server 104 location data corresponding to a number of scenarios such as being within a respective area of interest (e.g., 410).

At step 1012, server 104 stores the received location data for further analysis. At step 1014, server 104 received location data indicating that mobile device 102 is at a second location (e.g., location 507) outside each of the first set of areas of interest 410 and outside each of the proximities, in response, method 1000 proceeds to perform steps 1006-1012 based on the second location.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

We claim:

1. A computer implemented method of collecting location data of a mobile device in communication with a network, the method comprising:
at a mobile device comprising a processor and memory storing therein instructions for execution by the processor:
providing, to a server in the network, location data indicating a first location of the mobile device at a first time;
receiving first geo data from the server, the first geo data including a first region around the first location and a first set of areas of interest in the first region, each of the first set of areas of interest having a respective geographical boundary;
registering the first geo data with an operating system of the mobile device;
collecting location data indicating locations of the mobile device in response to the mobile device being detected to be inside any particular area of interest of the first set of areas of interests;
providing collected location data to the server;
in response to a predetermined movement status of the mobile device being detected after the mobile device is detected to have exited the first region, providing, to the server, location data indicating a second location of the mobile device at a second time, the predetermined movement status indicating that the mobile device is stationary or has a speed of movement less than 5 miles/hour;
receiving second geo data from the server, the second geo data including a second region around the second location and a second set of areas of interest in the second region, each of the second set of areas of interest having a respective geographical boundary; and
registering the second geo data with the operating system of the mobile device, the second geo data replacing the first geo data at the operating system.

2. The method of claim 1, wherein the location data indicating the second location of the mobile device is provided to the server at the second time in response to the mobile device being detected to be at the predetermined movement status for longer than a predetermined length of time.

3. The method of claim 2, further comprising tracking the movement status of the mobile device in response to the mobile device being detected to have exited the first region.

4. The method of claim 1, wherein:
the collected location data includes first location data indicating a first series of locations corresponding, respectively, to a first series of time intervals spanning across a first portion of a time period during which the mobile device remains within the particular area of interest;
the collected location data further includes second location data indicating a second series of locations corresponding, respectively, to a second series of time intervals spanning across a second portion of the time period subsequent to the first portion of the time period; and
each time interval in the second series of time intervals is greater in duration than any of the first series of time interval.

5. The method of claim 1, wherein:
the collected location data includes first portions of the location data collected during respective time windows of a series of first time windows, and second portions of the location data collected during respective time windows of a series of second time windows subsequent to the series of first time windows, each of the series of second time windows is larger than any of the series of first time windows; and
providing collected location data to the server comprises:
at an end of each first time window of the series of first time windows, transmitting at least some of the first portion of the location data collected in the each first time window to the server; and
at an end of each second time window of the series of second time windows, transmitting at least some of the second portion of the location data collected in the each second time window to the server.

6. The method of claim 5, wherein each of the series of first time windows is about 1-5 minutes, and each of the series of second time windows is about 2-10 minutes.

7. The method of claim 1, wherein the respective geographical boundary of each of the first set of areas of interest is associated with a respective entity and is based at least on a location and a geographical size of the respective entity.

8. The method of claim 1, wherein the first region is centered at the first location and has a radius determined by a location of an area of interest among the first set of areas of interest that is furthest from the first location.

9. The method of claim 1, wherein the first set of areas of interest are associated, respectively, with a plurality of distinct entities.

10. The method of claim 1, wherein the first region is centered at the first location and has a predetermined radius.

11. The method of claim 1, further comprising, in response to the mobile device being detected to have exited a respective area of interest of the first set of areas of interests, pausing collection of location data indicating locations of the mobile device.

12. A mobile device comprising:
one or more processors; and
memory coupled to the one or more processors, the memory storing therein one or more programs configured to be executed by the one or more processors, the one or more programs including instructions for:
providing, to a server in a network, location data indicating a first location of the mobile device at a first time;
receiving first geo data from the server, the first geo data including a first region around the first location and a first set of areas of interest in the first region, each of the first set of areas of interest having a respective geographical boundary;
registering the first geo data with an operating system of the mobile device;
collecting location data indicating locations of the mobile device in response to the mobile device being detected to be inside any particular area of interest of the first set of areas of interest;
providing collected location data to the server;

in response to a predetermined movement status for the mobile device being detected to be outside the first region, providing, to the server, location data indicating a second location of the mobile device at a second time, the second location being outside of each of the first set of areas of interest, the predetermined movement status indicating that the mobile device is stationary or has a speed of movement less than 5 miles/hour;

receiving second geo data from the server, the second geo data including a second region around the second location and a second set of areas of interest in the second region, each of the second set of areas of interest having a respective geographical boundary; and registering the second geo data with the operating system of the mobile device, the second geo data replacing the first geo data at the operating system.

13. The mobile device of claim 12, wherein the location data indicating a second location of the mobile device is provided to the server at the second time in response to the mobile device being detected to be at the predetermined movement status for longer than a predetermined length of time.

14. The mobile device of claim 13, wherein the one or more programs further include instructions for tracking the movement status of the mobile device in response to the mobile device being detected to have exited the first region.

15. The mobile device of claim 12, wherein:
the collected location data includes first location data indicating a first series of locations corresponding, respectively, to a first series of time intervals spanning across a first portion of a time period during which the mobile device remains within the particular area of interest;
the collected location data further includes second location data indicating a second series of locations corresponding, respectively, to a second series of time intervals spanning across a second portion of the time period subsequent to the first portion of the time period; and
each time interval in the second series of time intervals is greater in duration than any of the first series of time interval.

16. The mobile device of claim 12, wherein:
the collected location data includes first portions of the location data collected during respective time windows of a series of first time windows, and second portions of the location data collected during respective time windows of a series of second time windows subsequent to the series of first time windows, each of the series of second time windows is larger than any of the series of first time windows; and
providing collected location data to the server comprises:
at an end of each first time window of the series of first time windows,
transmitting at least some of the first portion of the location data collected in the each first time window to the server; and
at an end of each second time window of the series of second time windows,
transmitting at least some of the second portion of the location data collected in the each second time window to the server.

17. A non-transitory computer readable medium storing therein computer program instructions, which, when executed by one or more processors, cause the one or more processors to carry out a method of collecting location data of a mobile device in communication with a network, the method comprising:
providing, to a server in the network, location data indicating a first location of the mobile device at a first time;
receiving first geo data from the server, the first geo data including a first region around the first location and a first set of areas of interest in the first region, each of the first set of areas of interest having a respective geographical boundary;
registering the first geo data with an operating system of the mobile device;
collecting location data indicating locations of the mobile device in response to the mobile device being detected to be inside any area of interest of the first set of areas of interests;
providing collected location data to the server;
in response to a predetermined movement status of the mobile device being detected after the mobile device is detected to have exited the first region, providing, to the server, location data indicating a second location of the mobile device at a second time, the predetermined movement status indicating that the mobile device is stationary or has a speed of movement less than 5 miles/hour;
receiving second geo data from the server, the second geo data including a second region around the second location and a second set of areas of interest in the second region, each of the second set of areas of interest having a respective geographical boundary; and
registering the second geo data with the operating system of the mobile device, the second geo data replacing the first geo data at the operating system.

18. The non-transitory computer readable medium of claim 17, wherein the location data indicating a second location of the mobile device is provided to the server at the second time in response to the mobile device being detected to be at the predetermined movement status for longer than a predetermined length of time.

19. The non-transitory computer readable medium of claim 18, wherein the method further comprises tracking the movement status of the mobile device in response to the mobile device being detected to have exited the first region.

20. The non-transitory computer readable medium of claim 19, wherein the method further comprises pausing collection of location data indicating locations of the mobile device in response to the mobile device being detected to have exited a respective area of interest of the first set of areas of interests.

* * * * *